March 27, 1934.    R. O. KAPP ET AL    1,952,258
PROTECTIVE ARRANGEMENT FOR ELECTRIC POWER LINES
Filed May 23, 1929    10 Sheets-Sheet 1

Inventors:
Reginald Otto Kapp
and Charles George Carrothers
By [signature] Attorney

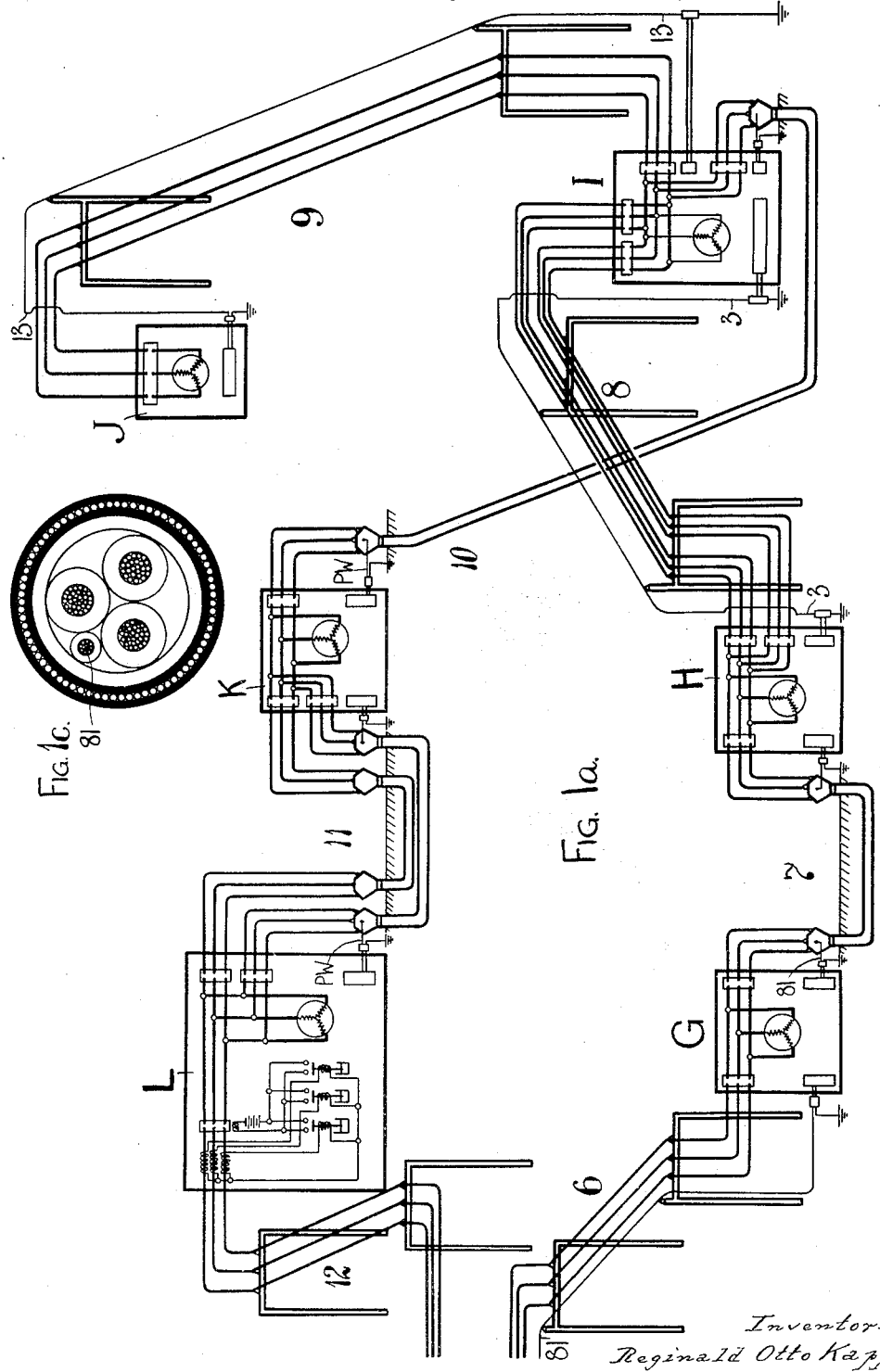

March 27, 1934.　　　R. O. KAPP ET AL　　　1,952,258
PROTECTIVE ARRANGEMENT FOR ELECTRIC POWER LINES
Filed May 23, 1929　　　10 Sheets-Sheet 3
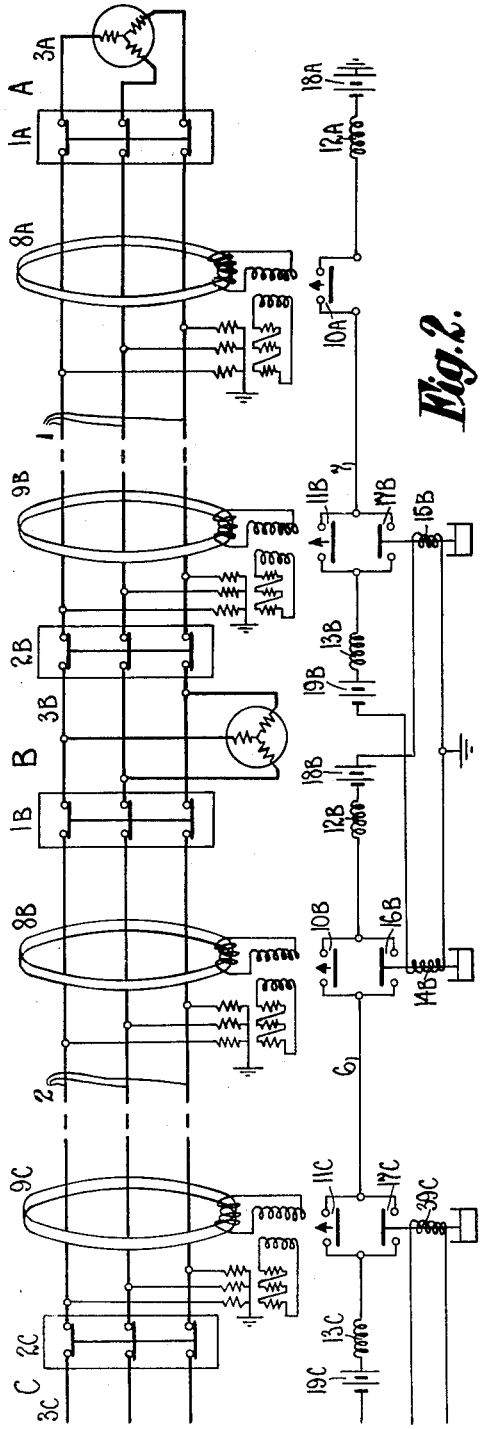
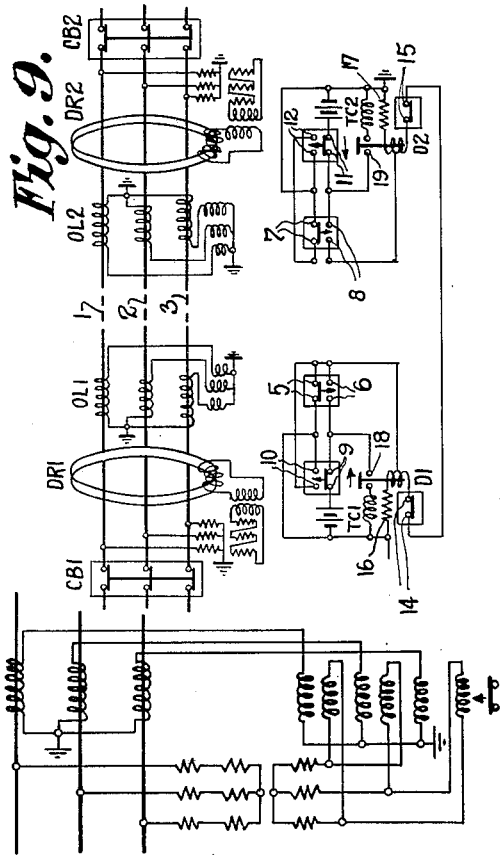
Inventors:
R. O. Kapp and C. G. Carrothers
By Emil Bönnelycke
Attorney

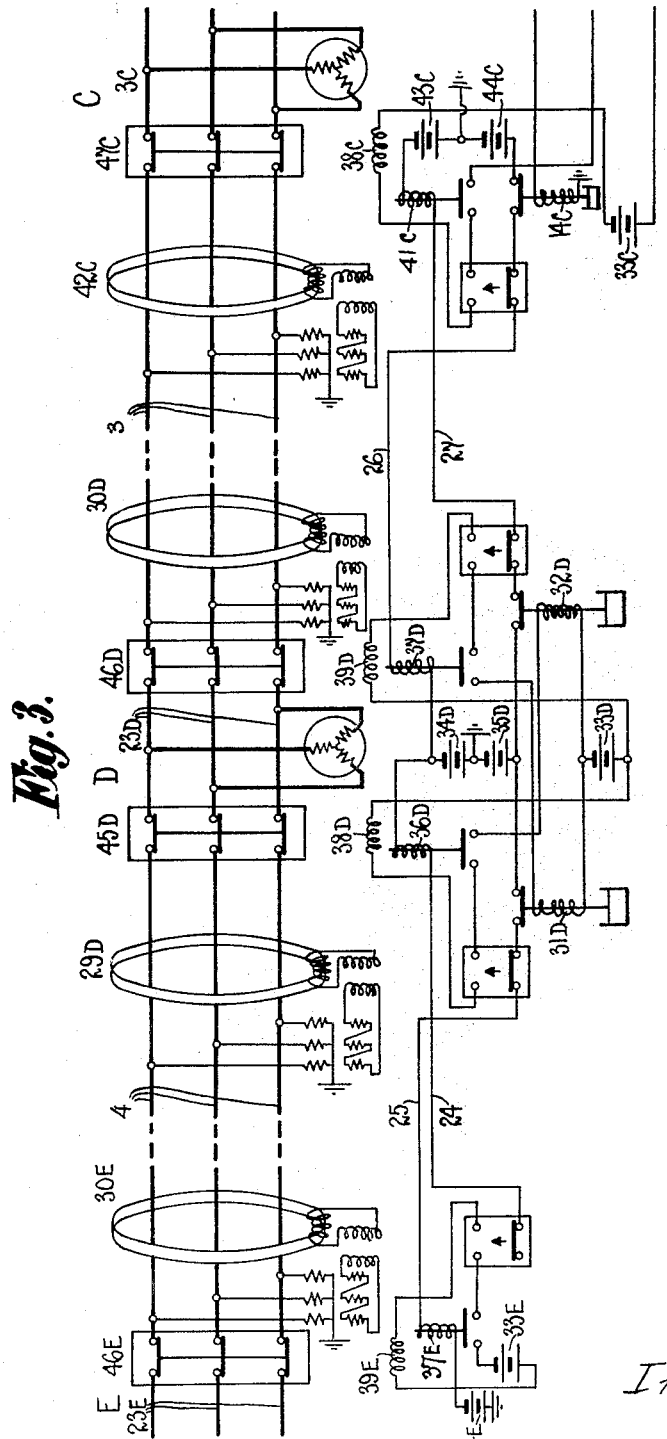

Inventors:
R. O. Kapp and C. G. Carrothers
By Emil Bonnelycke
Attorney

March 27, 1934.                R. O. KAPP ET AL                1,952,258
             PROTECTIVE ARRANGEMENT FOR ELECTRIC POWER LINES
                    Filed May 23, 1929          10 Sheets-Sheet 7

Inventors:
R. O. Kapp and C. G. Carrothers
By Emil Bömelyhe Attorney

March 27, 1934.  R. O. KAPP ET AL  1,952,258
PROTECTIVE ARRANGEMENT FOR ELECTRIC POWER LINES
Filed May 23, 1929  10 Sheets-Sheet 8

Inventors:
Reginald Otto Kapp
and Charles George Carrothers
By
Attorney.

Patented Mar. 27, 1934

1,952,258

UNITED STATES PATENT OFFICE 1,952,258

PROTECTIVE ARRANGEMENT FOR ELECTRIC POWER LINES

Reginald Otto Kapp and Charles George Carrothers, London, England, assignors to Brown Boveri & Company Limited, Baden, Switzerland, a Swiss company Application May 23, 1929, Serial No. 365,527
In Great Britain May 23, 1928

23 Claims. (Cl. 175—294)

The present invention relates to improvements in or relating to protective arrangements for electric transmission systems whether, for example, for power lines in an overhead transmission system or for cables in a high tension underground system and more particularly concerns improved arrangements for clearing faults on a line or cable with a minimum amount of disturbance to the system of which the line or cable forms a part, the general object of such arrangements being to isolate only the faulty section while the remainder of the system remains in service.

The principal object of the invention is to provide reliable means by which the controlling apparatus may be made highly and reliably selective so as to eliminate the risk of sections other than the section or sections which require to be cut out being affected and may be generally independent of time lag devices or marginal devices for their operation.

Broadly speaking the invention is characterized in that, in the event of a fault occurring in a section, current flowing over a pilot wire is reduced to zero or changed to a current having a particular value, direction or other characteristic which differs from the current flowing in the pilot wire if the fault occurs in some other section of the system.

One of the features of the present invention concerns the provision of switching devices at each end of a section of a system which devices respond to current flowing in the section, i. e. either residual current or balanced current, and are arranged in certain circumstances, when a fault occurs or under normal running conditions and, when the current flowing in at one end is the same as the current flowing out at the other to cause current to flow over a pilot wire or like equivalent circuit. The pilot wire is arranged in a circuit which includes controlling devices at one or both ends which controlling devices are adapted to respond to effect the isolation of the section when the flow of current through the pilot wire circuit is interrupted or changed to a current having a predetermined characteristic such as direction or value when current flowing into the section at one end differs in value and/or direction from the current flowing at the other end.

A further feature of the present invention is the provision of controlling arrangements in conjunction with the pilot wire circuit by which interruption of current flowing over the pilot wire circuit in certain circumstances (i. e. on a fault occurring) is adapted to effect the cutting out of the section with which it is associated.

Another feature of the present invention, which is allied to the two features already mentioned, is that the controlling arrangements are arranged in such a way that the absence of current flowing in the pilot wire or the flow of current in the pilot wire having a predetermined characterizing feature differing from that of the current flowing in other circumstances (i. e. on a fault occurring in another section) is adapted to cause a circuit to be closed for the purpose of effecting the cutting out of the section. The controlling arrangements to attain the above results may be conveniently in the form of a duplex, quadruplex or multiplex signalling arrangement as used in telegraphy. In certain multiplex signalling arrangements as used in telegraphy it is necessary to use synchronously moving parts and, while it is possible to use such parts for protecting power lines, it is probably undesirable as they will require more maintenance and are more likely to get out of order. For this reason it would be preferable to use multiplex signalling arrangements of the type in which the various channels correspond to different frequencies of alternating current and this term "multiplex signalling", it must be understood covers carrier current arrangements and voice current signalling arrangements. It would also be apparent that while the term "pilot wire" is used it is capable of being replaced by any equivalent circuit, for instance by a wireless transmitting and receiving arrangement or by superimposed circuits as well as simple direct wire circuits. Further, the direct wire circuits may run alongside the cable or could be lines running, for instance to a central station so as to make use of the wire already in existence, or they could be lines normally used for some other purpose.

Further features of the invention include arrangements for varying one characteristic of a quadruplex signalling system independently of the variation of a second characteristic, such variation being arranged to effect the cutting out of a faulty section. The variation of the other characteristic could be used for cutting out a second section running between the same two points as the first section or could be used for the insertion of a time lag control if the principal control fails for any reason, or it could be arranged for sending controlling currents for different kinds of faults from those for which the variations of the first characteristic are used or for sending signals.

Similarly the invention contemplates as a further feature the cutting out of a faulty section by controlling currents transmitted over any one channel of a multiplex signalling arrangement.

A further feature of the present invention concerns the provision of current or power measuring devices located at each end of a section of the system which devices are arranged to control the cutting out of the section if they are not actuated in the same manner.

It may happen that the circuit-breakers fail to operate when tripped to isolate the faulty section and the invention therefore contemplates the provision of a time lag device which would operate after a short delay to operate the circuit-breaker at the end of the section which is adjacent to the faulty circuit-breaker so as to ensure the isolation of the fault even in this case.

One of the advantages of employing controlling arrangements operating over the pilot wire as covered by the preceding features is that if a fault develops in such circuits due, for instance, to the pilot wire being broken, it is possible still to effect the automatic isolation of the section and a further novel feature of the invention therefore relates to the provision of a section of cable for electric power transmission systems in which the pilot wire is embedded in the cable, such pilot wire being connected to controlling devices which are influenced by current flowing over the pilot wire so that they will not prevent the automatic isolation of the section when the pilot wire circuit is broken. Similarly in overhead transmission lines the invention contemplates utilizing an insulated pilot wire arranged in the earthing wire instead of one of the strands thereof, such pilot wire being provided with similarly arranged controlling devices.

In certain cases it is desirable that an alternative protection should be provided in case the pilot wire should break and a further feature of the invention contemplates providing for this by arranging that while direct current of one value flows over the pilot wire when a fault occurs in another section direct current of a different value flows over the pilot wire when the fault occurs in the section but if for any reason current should fail to flow then the trip circuits of the circuit-breakers at the ends of the section could be placed out of action and replaced by a time lag protection. It may happen, however, that the pilot wire breaks at the moment of a fault in which event it could be arranged that the time lag is only brought into operation after a delay so as to permit the switches in this case to operate before the time lag becomes operative.

It is believed that a further novel feature of the invention relates to the provision of two protecting means one of which is normally in action and enables the section to be selectively and immediately isolated on the occurrence of a fault in the section and a second protecting means of a cruder nature such as time lag devices which are brought into action automatically in the event of the first protecting means becoming faulty for any reason.

Again, due to the invention providing such a reliable means for cutting out a faulty section, that is to say, means which are both highly selective and operate immediately to isolate a section, it is possible in a complete transmission system still to employ time lag devices or devices dependent upon a time element for protecting some of the sections with a consequent reduction of cost and the invention therefore contemplates provision of a complete system having protecting arrangements of the different kinds mentioned for protecting different sections. It will be clear that the effect of introducing sections protected in such a way as reliably to ensure the cutting out of a faulty section only into a system which is protected by a cruder form of protection will make the cruder form of protection relatively more efficient. Except where current or power measuring devices are used exclusively for the protection of a section the invention contemplates the employment of directional relays which may be operated by either residual or balanced current. In the latter case of course the relays would be operated whenever current flowed on the line in a particular direction, while in the former case the relays would be operated only when a fault occurred and caused residual currents to flow in a particular direction. The residual current is the algebraic sum of the instantaneous values of the currents flowing in the different conductors of a power line. The currents in the power line are balanced when the residual current is zero.

These and other features of the invention will be better understood by referring to the following description having reference to the accompanying drawings which show by way of example illustrative embodiments of the invention.

Figures 1 and 1a show a complete transmission system including overhead transmission lines and underground cables together with protecting arrangements suitable for isolating faults according to the individual conditions of the various lines.

Figure 1b shows a section of a stranded earthing wire with interlocked strands having an insulated pilot wire forming one of the strands for use with overhead transmission lines when employing protective arrangements according to the invention.

Figure 1c shows a section of a cable having a pilot wire embedded therein. It is possible by means of the present invention to utilize a pilot wire in this position for protective purposes.

Figure 2 shows an arrangement for controlling the cutting out of a faulty section over a pilot wire circuit and for cutting out an adjacent section under the control of time lag devices.

Figure 2a shows the use of a power balanced relay.

Figure 3 shows an arrangement for controlling the cutting out of a faulty section by opening circuits over a pair of pilot wires and also for cutting out an adjacent section under the control of time lag devices.

Figure 9 shows a modification of the arrangement shown in Figure 5 which is applicable to sections in which power is supplied from one end only.

Figure 11:
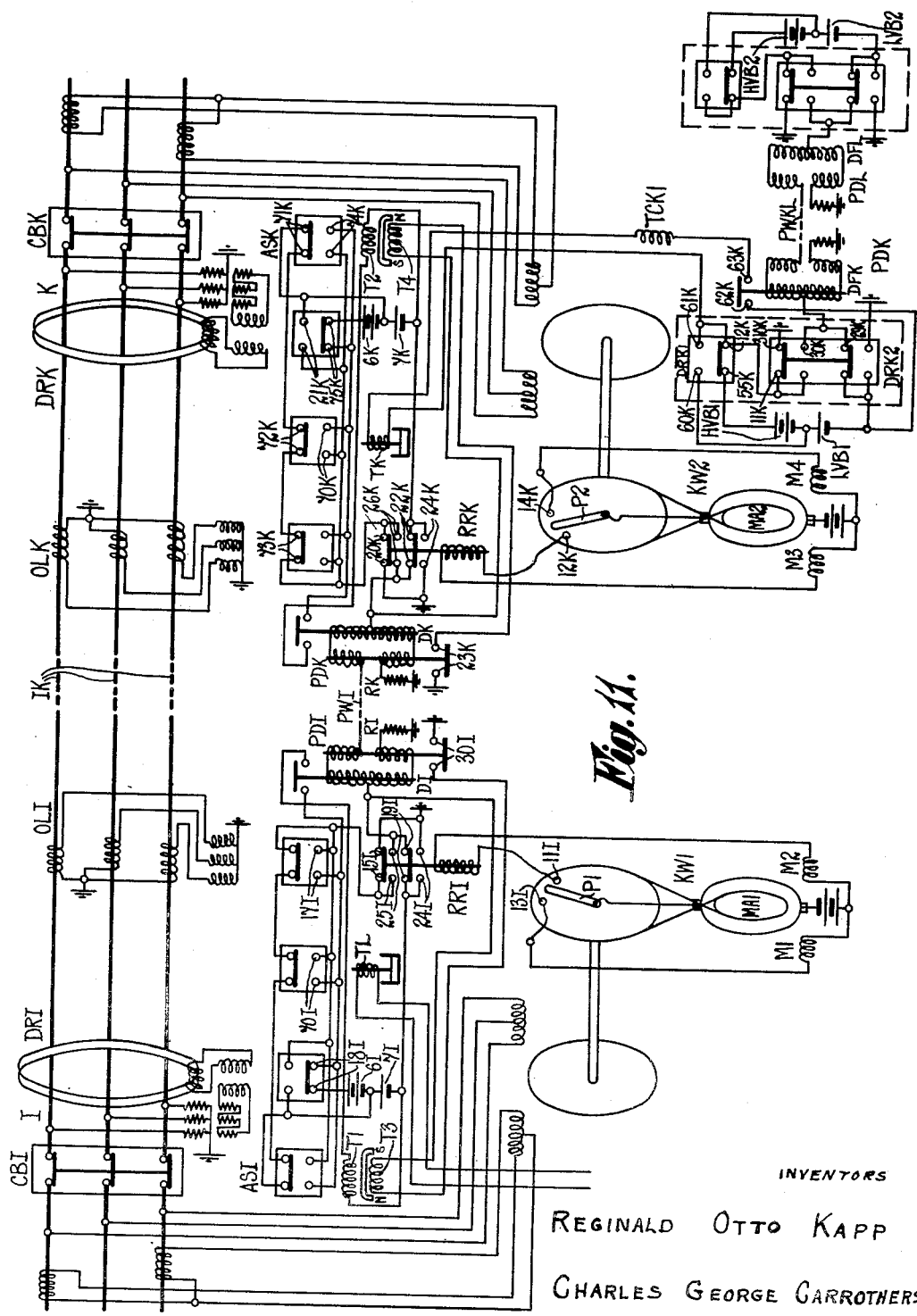

Figure 11 shows circuit controlling arrangements resembling those employed in quadruplex signalling in which one channel is employed for protecting the section from faults of the kind in which the earth currents are sufficiently great as to change the direction of current flow or substantially arrest the flow of current at one end, i. e. when the differences between the currents flowing into or in the section at one end and out at the other are very considerable, while the other channel is employed for protecting the section from faults of the kind in which the leakage is comparatively small as in underground cables and is determined by the different manners in which current or power measuring devices at each end of the section respond to the current or power flowing at the end with which they are associated.

Figure 12:
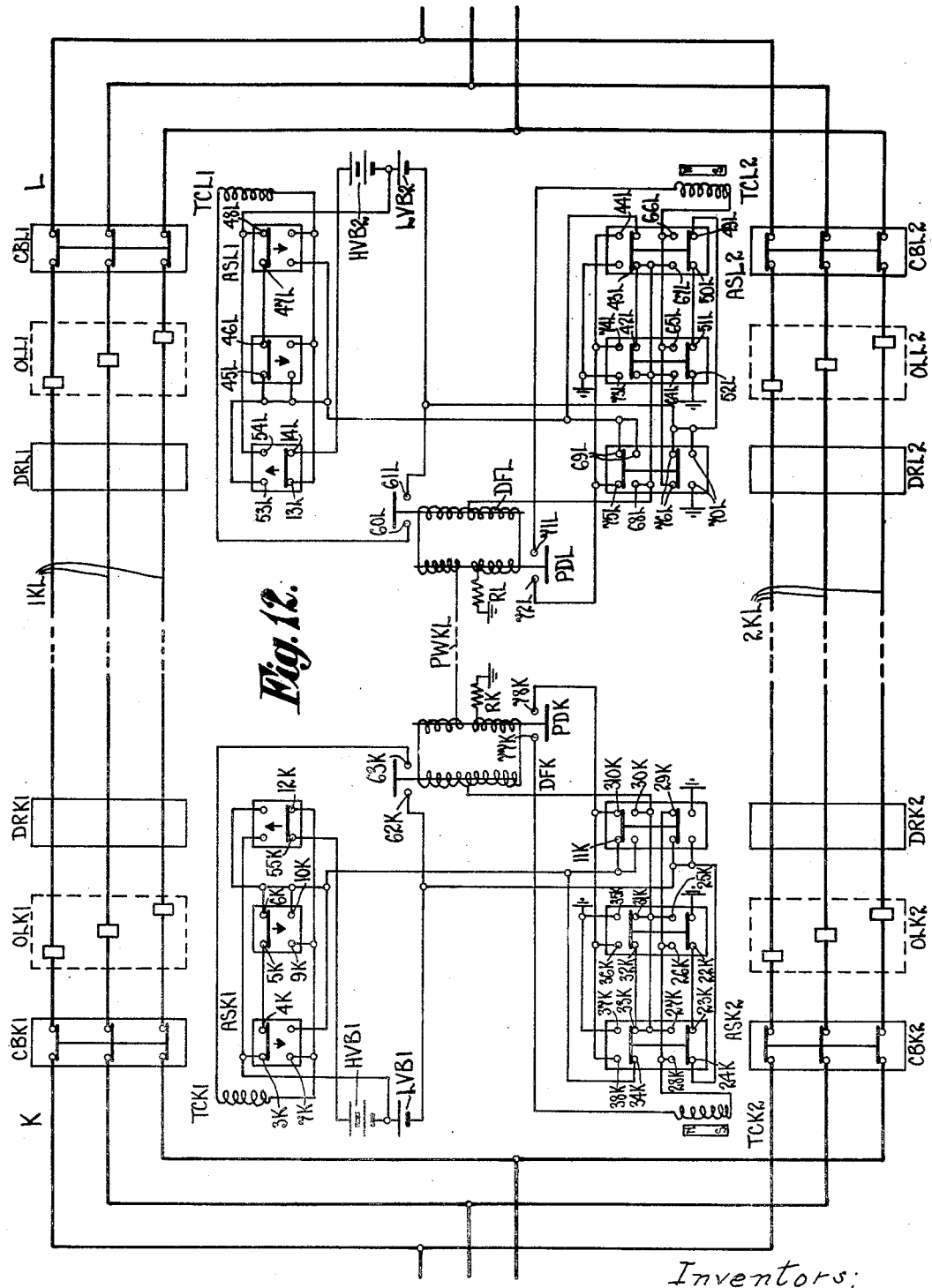

Figure 12 shows the application of the arrangement shown in Figure 9 to quadruplex working to enable two sections running between the same points to be protected by a single pilot wire.

Figures 1, 1B:
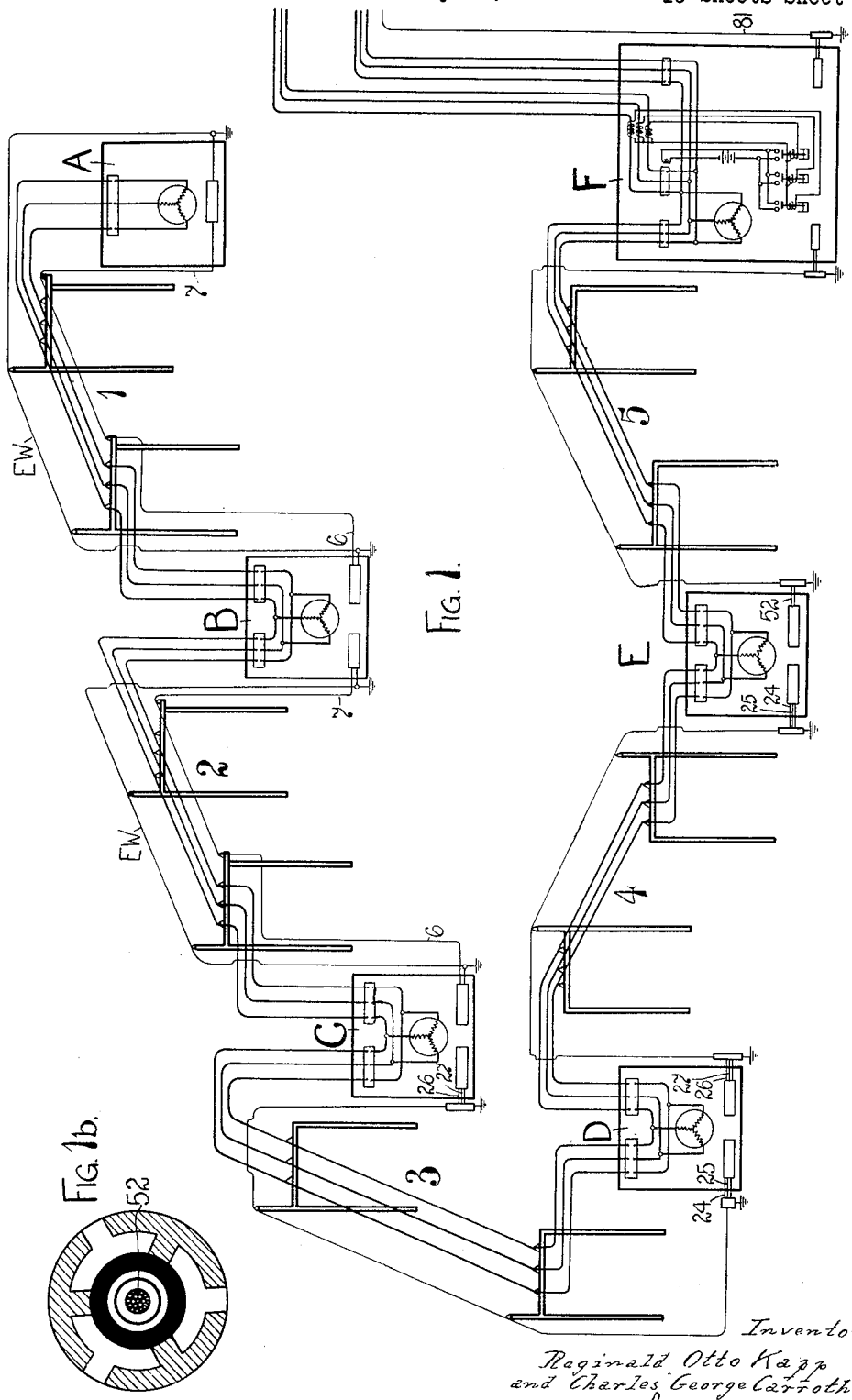

Referring to Figures 1 and 1a which show a complete transmission system of three-phase high tension alternating current comprising the overhead transmission lines 1, 2, 3, 4, 5, 6, 8, 9, 12 and the underground cables 7, 10 and 11. The lines 1, 2, 3, 4 and 5 are in tandem while the lines 6, 7, 8, 10, 11, 12 form a ring main interconnected with the tandem lines at station F while the line 9 connects a station J to the ring main at station I.

It will be assumed that each of the stations A, B, C, D, E, F, G, H, I, K and L are generating stations adapted to supply power to the system or take power from the system according as to whether the local demand for power is below or above the amount generated locally, while station J is purely a power consuming station.

While Figures 1 and 1a only show the protective apparatus in a very schematic manner, details of the apparatus and its manner of operation will be described more particularly with reference to Figures 2–11 of the accompanying drawings.

The transmission lines 1 and 2 between stations A and B, and B and C respectively are provided with both a pilot wire represented by the reference 6 at the left-hand end and 7 at the right-hand end, and an earthing wire EW which are run on separate lines. The arrangement employed for protection will correspond at station B to that shown and described with reference to Figure 2; at station A the arrangements will be identical with those shown at the right-hand side of Figure 2 except that the positive pole of battery 18A will be connected direct to earth. The protecting arrangements at the right-hand side of station C will be similar to those at the left-hand side of Figure 2, except that the coil 14B will control contacts arranged similarly to those controlled by coil 31D of Figure 3 so as to open the pilot wire circuit when energized and not to close it. The transmission lines 3 and 4 are provided with two pilot wires forming insulated strands of the stranded earthing wire similar in section to that shown in Figure 1b, except that there are two cores instead of one in the centre. The protective arrangements shown in Figure 3 are especially adapted to permit of the pilot wires being so arranged that in the event of the earthing wire being damaged and the pilot wires broken the circuit-breakers can still operate to isolate the faulty section. At station D the apparatus is the same as that between the leads 24 and 25 and the leads 26 and 27 of Figure 3; while at the right-hand side of station C the apparatus is the same as the apparatus at the right-hand side of the apparatus between the leads 24 and 25 and the leads 26 and 27 of Figure 3, except that the coil 32D controls contacts similar to the contacts 17B controlled by coil 15B. At the left-hand of station C the apparatus is the same as the apparatus at the left-hand side of the apparatus between the leads 24 and 25 and the leads 26 and 27 of Figure 3, except that the coil 31D and its contacts are omitted or are controlled in a different manner.

The transmission line 5 is provided with a single pilot wire forming an insulated strand of the stranded earthing wire, shown in section Figure 1b. The strands are interlocked, as shown, to prevent the insulation being worn away due to the normal contractions and expansions of the cable under temperature changes or varying strains. The protective arrangements would then conveniently take the form shown in Figure 4 as in this case also the circuit-breakers can still operate to isolate the section 5 if faulty, even although the pilot wire is broken. It will be understood that the protective arrangements at the right-hand of station F would be the same as the protective arrangements shown more in detail at the left-hand side of Figure 5 and the protective arrangements at the left-hand of station F would be the same as the protective arrangements shown more in detail the right-hand side of Figure 4.

Station F is on the ring including overhead transmission lines 6, 8, 12 and cables 7, 10 and 11. Transmission line 6 is similar to transmission line 5 and the pilot wire 81 again forms an insulated strand of the stranded earthing wire, for instance as shown in Figure 1b. In this case it has been found that further advantages could be obtained by arranging controlling arrangements so that not only are the controlling arrangements at the two ends of the pilot wire balanced but also the circuit as regards the controlling devices at each end are balanced. Such an arrangement is shown in detail in Figure 5 of the drawings. The protecting arrangements at the right-hand side of station F corresponding to the protecting arrangements are shown more in detail at the left-hand side of Figure 5, while the protecting arrangements at the left-hand side of station G correspond to the protecting arrangements shown more in detail at the right-hand side of Figure 5.

Figure 6:
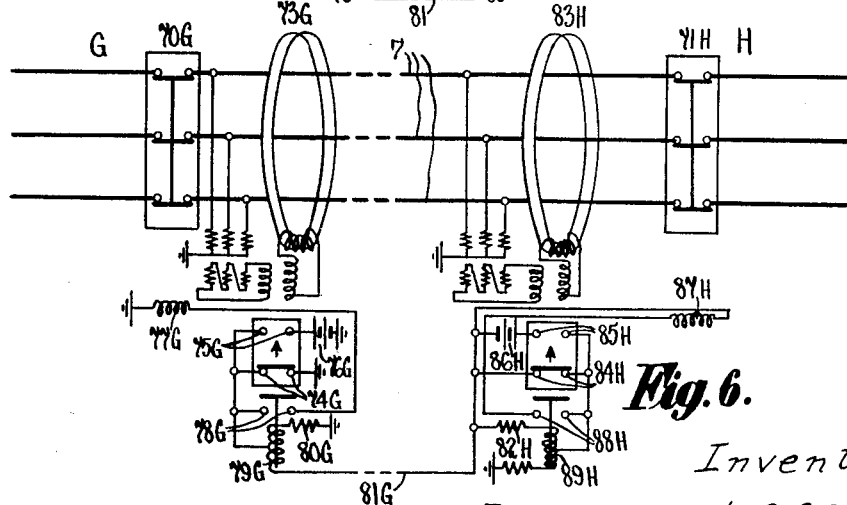
Figure 6 shows another arrangement somewhat similar to that shown in the preceding figure in which the circuit controlling arrangements resemble those employed in that kind of signalling known as "combined duplex" signalling in the art of telegraphy.

The stations G and H are linked together by an underground cable having a pilot wire embedded therein. Such a cable for the three-phase transmission system described may conveniently have a section such as that shown in Figure 1c. In this case it is necessary that the protecting arrangements should be such as to permit the circuit-breakers to isolate the section even although in the event of a fault occurring in the cable the pilot wire is itself broken or damaged. A convenient form of protection in these circumstances is shown in Figure 6 and it will be understood that the protective arrangements at the left-hand side of Figure 6 show more in detail the protective arrangements at the right-hand side of station G while the protective arrangements at the left-hand side of station H are shown more in detail at the right-hand side of Figure 6.

Figure 8:
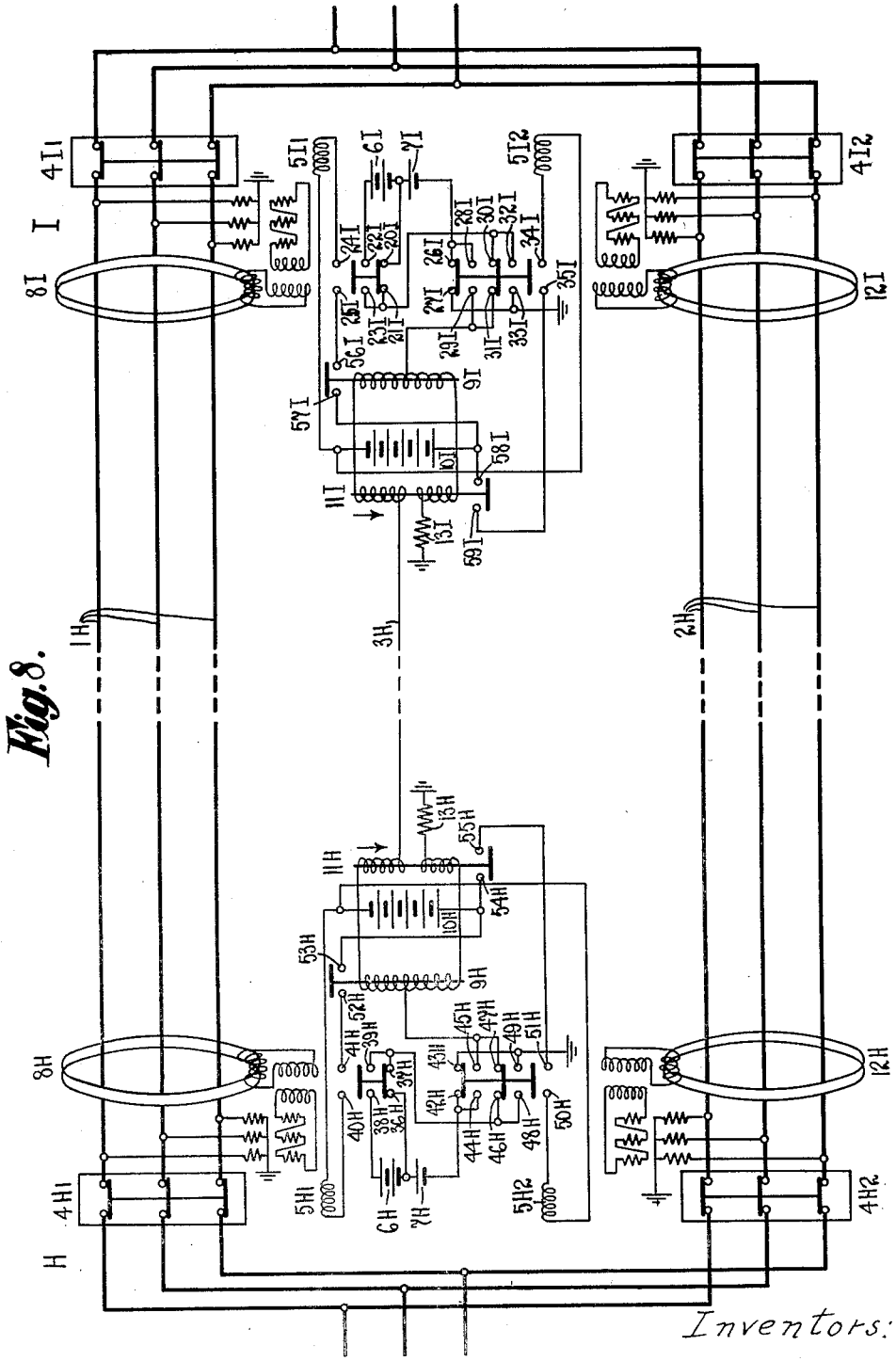
Figure 8 shows circuit controlling arrangements employed in conjunction with a pilot wire, which resemble those employed in "quadruplex" signalling in the art of telegraphy; one channel being employed for controlling the cutting out of one section, while the other channel is employed for the cutting out of another section running between the same points.

The stations H and I are interconnected by two separate three-phase transmission lines and in order that only a single pilot wire forming an insulated strand of a stranded earthing wire may be used for the protecting of both lines an arrangement such as that shown in Figure 8 should be used. This arrangement shows a quadruplex signalling arrangement for protecting the power lines. The protective arrangements for both lines are represented by rectangles in the right-hand side of station H and the left-hand side of station I and are shown more in detail in the left-hand and right-hand sides of Figure 8 respectively.

Figure 10:
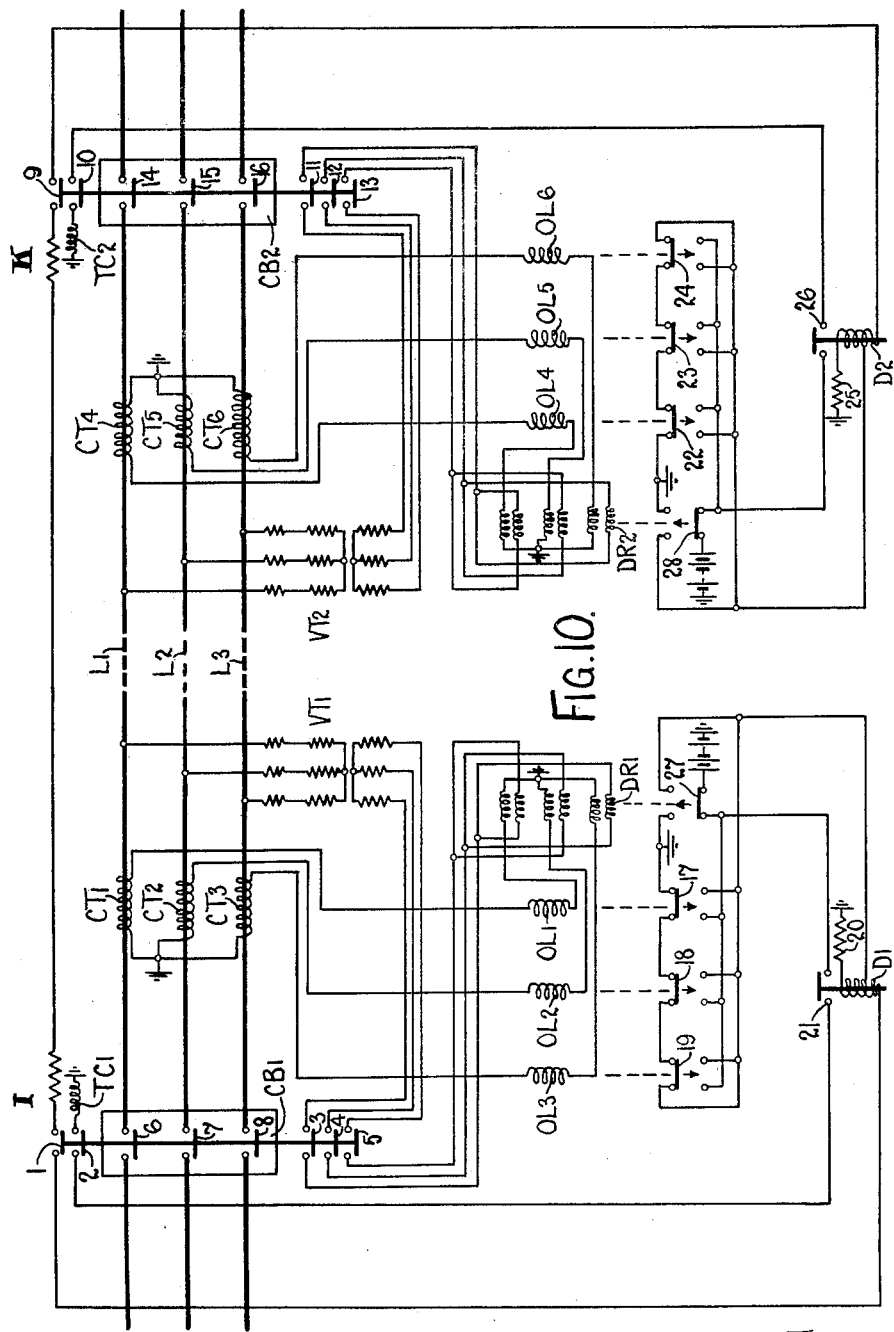
Figure 10 shows in greater detail the circuit arrangements of the arrangement shown in the preceding figure.

It may happen that current is fed to a terminal station where there is no generating apparatus. Such a condition is represented by station J. If a fault occurs then current can only be fed to the fault from station I. To meet these conditions protective arrangements, such as are shown in Figures 9 and 10, should be employed although they are also capable of being used in other circumstances as will be described later. The protective arrangements at the upper right-hand side of station I and station J are shown more in detail in the left-hand sides of Figures 9 and 10 and the right-hand sides of Figures 9 and 10 respectively.

Underground cables are normally subject to two kinds of faults as distinct from the kind to which overhead transmission lines are subject, namely faults of a serious character involving heavy currents to earth and faults in the nature of leaks often termed "incipient faults." These latter faults cannot be dealt with by the protective arrangements so far described and the cable 10 running between stations K and L is protected from both kinds of faults by protective arrangements in these stations, such as are shown more in detail in Figure 11.

Two cables 11 are provided for interconnecting stations K and L, which cables are protected only by a single pilot wire embedded in one cable. The protective arrangements in such a case would conveniently be of the kind described with reference to and shown in detail in Figure 12.

The transmission line 12 being the only remaining section of the system for interconnecting station L with station F can be protected by time lag devices which are well-known in the art and are represented by dash-pot relays. Due to the fact that all other sections of the system are selectively and immediately isolated by means of the protective arrangements, according to the invention it is clear that if a fault occurs which is not immediately cleared the fault will be on the transmission line 12 which therefore need only be protected in a much cruder manner and the expense of pilot wires can for this particular section be avoided.

Figure 2 shows in detail the protective arrangements between stations A and B, and B and C. The electric power line 2 between the stations B and C is connected to the bus-bar 3B at station B and to the bus-bar 3C at station C via the circuit-breakers 1B and 2C respectively, while the power line 1 between the stations A and B is connected to the bus-bars 3B and 3A via the circuit-breakers 2B and 1A respectively. The control of the circuit-breakers for the section between stations A and B is effected over a single pilot wire 7, while control of the circuit-breakers between the stations B and C is effected over the pilot wire 6. The control is effected by means of the directional protective relays 9C, 8B, 9B and 8A. These relays may either be leakage relays responsive to residual currents as illustrated in Figure 2, that is to say they are only energized when the vectorial sum of the currents flowing in the three phases of the transmission line is other than zero indicating that there is a leakage to earth or, the relays may be power relays responsive to balanced currents as illustrated in Figure 2a. If directional relays responsive to balanced currents are employed, then as long as conditions are normal no current flows through the relays or the current flow is in such direction as to operate the directional relay at one end of the line only but if a fault should develop the current flow would be such as to operate both directional relays. Included in the circuit of the pilot wire 6 are the trip coils 12B and 13C associated with the circuit-breakers 1B and 2C respectively, while included in the circuit of the pilot wire 7 are the trip coils 13B and 12A associated with the circuit-breakers 2B and 1A respectively. The source of electrical energy for operating the trip coils is obtained from the batteries 19C, 18B, 19B, 18A, the batteries at station B forming a single battery split into two parts which are connected at the junction to earth or to return pilot wires by way of the coils 15B and 14B respectively of time lag relays, which relays serve to close contacts 17B and 16B a predetermined time after they have been energized, which predetermined time is preferably adjustable. As station A is a terminal station and as the purpose of the time lag relays, as will be described, is to close a point in the pilot wire of an adjacent section, it will be appreciated that no time lag relays are required at this station. At station C the battery 19C is connected to a time lag relay 14 C which operates to open contacts in the circuit of the pilot wire 26 as in this case the protection arrangements differ for reasons which have already been described. The time lag relay 39C which controls the pilot wire 6 is controlled in the circuit of the trip coil 38C of the circuit-breaker 47C (Figure 3) to close contacts 17C in case the trip coil 38C fails to effectively trip the circuit-breaker 47C.

In order to explain the operation of the protection arrangements as illustrated in Figure 2, it will be supposed that an earth fault occurs on a portion of the line 1. Current will then flow through relay 9B in such a direction as to cause it to operate contacts 11B and through the relay 8A at the other end of the line 1 in the opposite direction so as to operate this relay also. Consequently a circuit is completed from earth, time lag coil 14B, battery 19B, trip coil 13B, contacts 11B, pilot wire 7, contact 10A, trip coil 12A, battery 18A to earth. If station A had not been a terminal station the circuit would have included at station A a time lag relay similar to coil 15B (at station B) arranged to operate contacts similar to 17B in the circuit of the pilot wire leading to the next station. If everything is in order the energization of the trip coils in this circuit causes circuit-breakers 2B and 1A to trip so that the fault is duly cleared. In case for some reason the circuit-breaker 2B should fail to open after a short time interval contacts 16B would be closed by the time lag relay 14B and a circuit would then be completed over the pilot wire 6 as follows: earth, time lag relay 15B, battery 18B, trip coil 12B, contact 16B, pilot wire 6, contact 11C, trip coil 13C, battery 19C, time lag relay 14C, to earth. In this circuit trip coils 13C and 12B would be energized causing the circuit-breakers 2C and 1B to trip so that lines 2 and 1 are both cut out, that is to say the faulty section and an adjacent section are cut out in this eventuality. It will be appreciated that although there may previously have been a fault current flowing through the directional relay 8B due to the fault under consideration, this current is in the wrong direction to operate this relay although it will have operated relay 9C at the other end of the line 2. This arrangement ensures that the circuit-breakers will only come out in the section on which the fault has occurred as it is clearly undesirable that more sections should be rendered dead than is absolutely necessary. The principal novel feature shown in this figure is the arrangement of the time lag devices by which, in the event of a circuit-breaker failing to trip, a circuit is completed to trip the circuit-breakers of an adjacent section.

Figure 3 shows a modified arrangement in which the feature of absence of current on the pilot wire of a faulty section is embodied.

In Figure 3 the electric power line 4 connects station E to station D while the power line 3 connects station D to station C. The power lines 4 and 3 are connected to the bus-bar 23D by way of the circuit-breakers 45D and 46D respectively, while the trip coils for the circuit-breakers 45D and 46D have the references 38D and 39D. The power line 3 is connected to the bus-bar 3C by way of the circuit-breaker 47C which circuit-breaker is controlled by the trip coil 38C, while the power line 4 is connected to the bus-bar 23E by way of the circuit-breaker 46E which is controlled by the trip coil 39E. Directional leakage relays 30E, 29D, 30D, 42C are provided as in Figure 2, the relays in these cases having changeover contacts. Use is also made of relays 36D, 37D, 37E and 41C which are now normally energized over the pilot wires 24, 25, 26, 27 and serve to hold open their associated contacts. Thus the circuit for coil 37D extends from earth, battery 34D, relay 37D, pilot wire 26, normally closed contacts of directional relay 42C, normally closed contacts of time lag relay 14C, battery 44C to earth. Instead of an earth connection a third pilot wire can be used connecting the points to which earth is connected, which will be readily appreciated. As long, therefore, as normal conditions are obtained all the pilot wire relays, 36D, 37D, 41C, 37E will be kept energized and the circuit for the trip coils 39E, 38D, 39D, 38C will be kept open. Assume now that a fault occurs on line 3 directional relay 30D will operate to break its lower contacts and to close its upper contacts. The effect of this is to open the circuit of pilot wire relay 41C and prepare a circuit for the trip coil 39D. Moreover at the same time directional relay 42C will have been operated to open the circuit of pilot wire relay 37D and to prepare a circuit for the trip coil 38C of the circuit-breaker 47C at station C. Owing to the release of the pilot wire relay 37D a circuit is now completed as follows: positive pole of battery 33D, trip coil 39D, upper contacts of directional relay 30D, contacts of pilot wire relay 37D, time lag coil 31D to negative pole of battery. Accordingly circuit-breaker 46D is operated. Circuit-breaker 47C at the other end of the line is also operated due to the energization of tripping coil 38C in the circuit, negative pole of battery 33C, trip coil 38C, upper contacts of directional relay 42C closed contacts of pilot wire relay 41C, time lag relay 39C (Figure 2) to positive pole of battery 33C. The purpose of the time lag coils is exactly the same as the purpose of the time lag coils 14B and 15B described in connection with Figure 2. That is to say, in the case of either the circuit-breaker 46D or 47C failing to operate, either the circuit-breaker 46E or 1B will operate to isolate the line 4 as well as the line 3 or the line 2 as well as the line 3, depending upon which circuit-breaker has failed. Thus if upon the occurrence of a fault on line 3 the circuit-breaker 46D fails to open after a time lag, the current flowing in the tripping circuit, which includes the coil 31D, causes the contacts controlled by that coil to open, whereby the pilot wire coil 37E at station E will be de-energized and since the directional relay 30E will have closed its upper contacts on the occurrence of a fault the tripping circuit for the circuit-breaker 46E will be completed when that circuit-breaker opens.

Actually in this case there are two pilot wires and depending upon the direction of current flow the breakage of a pilot wire will cause a circuit-breaker to trip in either of the following circumstances: i. e. in the case when directional relays responsive to residual currents are used and a fault occurs anywhere in the system and in the case when directional relays responsive to balanced currents as illustrated in Figure 2A are used, irrespective of whether a fault occurs in the system or not, the reason being that in this latter case one of the directional relays will always be energized. In the first case assuming that pilot wire 27 breaks and a fault occurs in line 4, then owing to current flowing to the fault from station C directional relay 42C will operate and pilot wire relay 41C will de-energize thereby completing a circuit for trip coil 38C causing circuit-breaker 47C to trip. In the second case one of the directional relays 42C or 30D, will always be operated and so a similar circuit wil be completed. On the other hand if pilot wire 26 breaks instead of pilot wire 27, then in the cases considered neither circuit-breaker 46D nor 47C will trip as the direction of current towards 4 will be such that directional relay 42C will operate and there will be an opening in the circuits of the tripping coils of each circuit-breaker.

The advantage of this latter construction is that not only is the line on which the fault occurs immediately selected and cut out, but even if the pilot wires are themselves damaged the circuit-breakers will still be operated.

Figure 4:
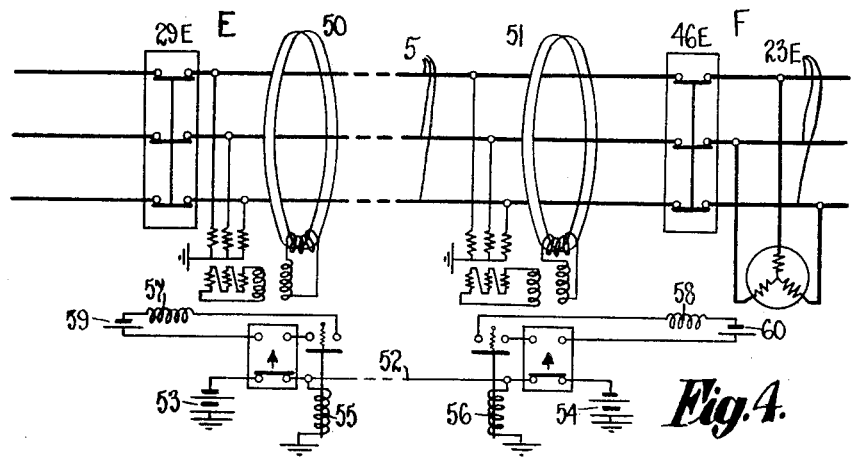
Figure 4 shows an arrangement for controlling the cutting out of a faulty section by reducing the current in a single pilot wire to zero or by breakage of the pilot wire, the controlling arrangements at each end of the pilot wire being identical.

The arrangement shown in Figure 4 possesses all the advantages of the last mentioned construction while employing only a single pilot wire.

Referring now to Figure 4 the stations E and F are connected by the electric power line 5. In this case the directional relays 50, 51 are arranged with their lower contacts in series with the pilot wire 52 and earthed batteries 53 and 54. At opposite ends of the pilot wire on the pilot wire side of each directional relay, pilot wire relays 55 and 56 respectively are connected between the pilot wire 52 and earth. The upper contacts of the directional relays are connected in the circuit of the trip coils 57 and 58 respectively. These circuits in both cases include contacts normally held open by the respective pilot wire relays as well as batteries 59 and 60 respectively. The battery 59 could be the same as battery 53, and battery 60 the same as battery 54. It will be noted that under the circuit conditions shown the pilot wire relay 55 is held energized both from its local battery 53 and from the distant battery 54 over the pilot wire. The pilot wire relay 56 is similarly energized from both batteries. In the case of a fault occurring in any section of the transmission system other than between stations E and F one or other, but not both of the directional relays 50 and 51 will be operated and have its upper contacts closed. If the directional relays are of the type which respond to balanced currents as shown in Figure 2a, then one or other of the directional relays 50 and 51 will always be energized. Consequently one of the pilot wire relays will be dependent for its energization on current flowing over the pilot wire. In the event of a fault in the line 5 then both directional relays will have their upper contacts closed, in which case both pilot wire relays will de-energize, the contacts controlled thereby will close and circuits will be closed for the trip coils 57 and 58. By this means the line is isolated. As the pilot wire relays both de-energize, it is clear that if the directional relays are of the type which respond to balanced currents it is immaterial whether the pilot wire 52 is itself broken due to the fault or not.

Hence by means of the present invention the line on which a fault occurs is immediately cut off irrespective of whether the pilot wire has been damaged or not. As a consequence it is possible by the present invention to embed the pilot wire in the insulation of the power cable without any danger of the protective system being deleteriously affected. Previously it has not been considered desirable to have a pilot wire forming part of the protective system embedded for this reason. In three-phase power cables where the individual conductors are each surrounded by a metallic sheath, the pilot wire could be embedded in the insulation outside the sheaths.

The arrangement just described is a balanced system as regards the controlling arrangements at the two ends of a pilot wire being identical but it was found that further advantages could be obtained by the provision of circuits which were balanced at each end as regards the controlling devices at that end and especially balanced circuits resembling those known as duplex, quadruplex and multiplex arrangements as employed in the art of telegraphy were found to give these advantages, and although certain multiplex signalling arrangements due to the use of normally moving parts are not usually practicable in a number of cases yet there is no reason why they should not be used if found to be suitable in special circumstances.

Figure 5:
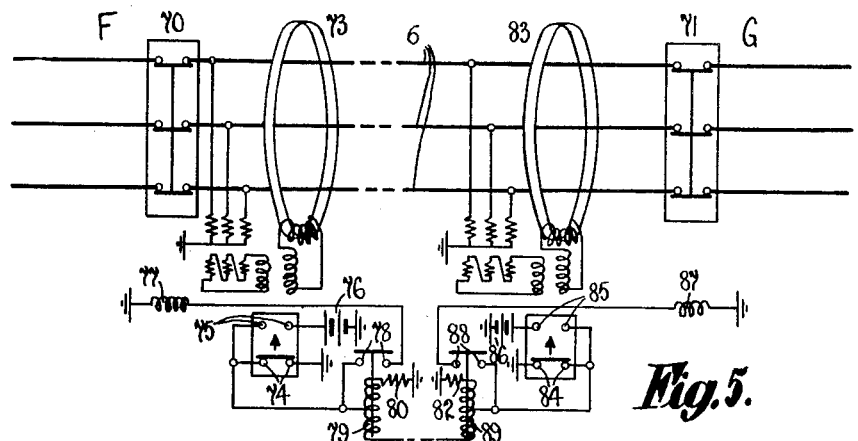
Figure 5 shows another arrangement for controlling the cutting out of a faulty section by reducing the current in a single pilot wire to zero, in which the circuit controlling arrangements resemble those employed in "opposed duplex" signalling in the art of telegraphy.

One arrangement know as "opposed duplex" will be described with reference to Figure 5. In this figure, 70 and 71 represent the circuit-breakers, one at each end of a line 6. Associated with the circuit-breaker 70 is a directional relay 73 in which the armature normally closes contacts 74, although when power is flowing through the line in a particular direction, namely, from left to right, the upper contacts 75 will be closed. In circuit with the upper contacts is a battery 76. The trip coil of the circuit-breaker is represented by the reference 77 and has connected in series with it contacts 78 controlled by the armature of an electromagnetic relay 79. The electromagnetic relay has windings having a connection made to the midpoint, as shown, so that when current is flowing through either the upper or lower half of the windings only the relay will operate, but if current is flowing from the centre-point through both windings then the relay will be de-energized. Associated with the circuit breaker 71 is a similar set of apparatus to that associated with the circuit-breaker 70 and including the directional relay 83 having lower contacts 84 and upper contacts 85, battery 86, trip coil 87, contacts 88 controlled by an electromagnetic device 89 having its windings arranged similarly to the windings 79. The operation is as follows: In the case of a fault occurring in any section of the transmission system other than between stations F and G, one or other but not both of the directional relays will have its upper contacts closed while the other will have its lower contacts closed. It will be assumed that the fault is on a section to the right of station G so that the contacts 75 are closed and also the contacts 84. In these conditions circuits may be traced as follows: earth, battery 76, contacts 75 to the midpoint of the windings of the electromagnet 79. Here the circuit divides one half going through the upper half of the said windings, resistance 80 to earth: while the other half goes through the lower half of the windings of the electromagnet 79, the pilot wire 81, lower part of the windings of the electromagnetic device 89, contacts 84 to earth. The result is that the currents flowing through the upper and lower windings of relay 79 oppose each other and as the resistance 80 is so chosen with respect to the remainder of the circuit, that is the pilot wire 81 and the lower winding of the electromagnet 89, that no attraction of the armature of 79 will take place, consequently the contacts 78 will remain open, as shown. At the other end of the line the current flowing through the lower winding of electromagnet 89 will cause its armature to be attracted and consequently contacts 88 to be closed. Trip coil 87 will not be operated in these circumstances due to the resistance of the pilot wire 81. However, if a fault occurs on the line 6 then the directional relay 83 will operate as well as the directional relay 73, contacts 84 will open and 85 close, whereupon new circuit conditions will be set up. As regards current flow over the pilot wire 81, it will be noted that the circuit over this wire can be traced as follows: earth, battery 76, contact 75, lower winding of magnet 79, pilot wire 81, lower winding of electromagnet 89, contacts 85, battery 86 to earth. As these batteries are opposed to each other and will normally be of the same or approximately of the same voltage, no current will flow in this circuit and consequently the lower windings of both of the magnets 79 and 89 will be of no effect. At each station, however, a circuit is completed through the upper winding which can be traced as follows at the left-hand station: earth, battery 76, contacts 75, upper winding of magnet 79 resistance 80 to earth. Consequently the electromagnet 79 attracts its armature and contacts 78 are closed thereby completing a circuit for the trip coil 77 and the circuit-breaker 70 is tripped. At the other station a similar circuit is completed for the upper winding of magnet 89, which can be traced as follows: earth, battery 86, contacts 85, upper winding of magnet 89, resistance 82 to earth. Consequently contacts 88 remain closed and a circuit is completed for the trip coil 87 as follows: earth, battery 86, contacts 85, contacts 88, trip coil 87 to earth. The circuit-breaker 71 is thereupon tripped and the faulty section cut out. If for any reason whilst the contacts 75 were closed the pilot wire 81 became broken or opened then the current flow through the lower winding of magnet 79 would cease and consequently the local circuit through the upper winding of magnet 79 would become effective, contacts 78 would be closed and the circuit-breaker 70 would be tripped. It will be appreciated that exactly the reverse conditions to those described would take place if the current was normally flowing in the opposite direction.

It will be noted that the circuit arrangements in this figure are somewhat similar as regards the control of the current over the pilot wire and the windings of the magnets 79 and 89 to those used in the well known "opposed duplex" system of telegraphy.

In Figure 6 a different duplex arrangement, known in telegraphy as the "combined duplex" is shown applied to protective systems according to the present invention. As this circuit so closely resembles Figure 5 the same reference numerals are used for the same parts with the addition of letter suffixes and need not therefore be further described. Such an arrangement is shown applied to section G—H for protecting the power line 7G.

In Figure 6 instead of a connection being made to the middle point of the winding of 79G it can be made at some other point, for instance in a position in which the number of turns of the winding in the upper part is approximately half the number of turns in the lower half. The same remarks apply to the connection to the intermediate point of the winding of magnet 89H. The pilot wire 81G in this case instead of being connected between the two lower windings of magnets 79G and 89H is connected across the windings of those magnets, the lower winding of magnet 89H being connected to earth. In the case of a fault occurring in any section of the transmission system other than between stations G and H, the directional relay 73G will be considered as being operated with contacts 75G closed and the directional relay 83H will be considered as having its contacts 84H closed. In these conditions circuits may be traced as follows: earth, battery 76G, contacts 75G, upper winding of magnet 79G, resistance 80G to earth, while a branch extends over the lower winding of magnet 79G, pilot wire 81G, contacts 84H, lower winding of magnet 89H, to earth. The value of resistance 80G is such that in this condition exactly twice the amount of current will flow through the upper winding of magnet 79G as compared to that flowing through the lower winding and the number of turns in the upper and lower windings is so chosen that in this condition there will be no magnetic force on the armature of magnet 79G and contact 78G will remain open. At the other station contact 88H will be closed as magnet 89H will be energized. In the event of a fault occurring in the section G—H then directional relay 83H will operate as well as relay 73G and contact 85H will close. The new circuit conditions will then be as follows: firstly a circuit over the pilot wire can be traced: earth, battery 76G, contacts 75G, lower winding of magnet 79G, pilot wire 81G, battery 86H, contacts 85H, lower winding of magnet 89H to earth. The batteries 76G and 86H are now in series and therefore the current flowing over the pilot wire will be doubled with the result that the effect of the lower winding of magnet 79G will preponderate over the effect of the upper winding, contact 78G will be closed, and the trip coil 77G will operate to trip the circuit-breaker 70G. At the other end of the line it will be noted that the current through the lower winding of the magnet 89H has also been doubled but at the same time a circuit is completed as follows: battery 86H, contacts 85H, upper winding of magnet 89H, resistance 82H, back to battery. This current, however, is only equal to that flowing through the upper winding of magnet 79G and resistance 80G and consequently the current flowing through the lower winding of magnet 89H preponderates and contacts 88H remain closed. The circuit for the trip coil 87H is therefore completed as follows: battery 86H, contacts 85H, contacts 88H, trip coil 87H back to battery. It will be noted that in this case, in the event of a fault occurring, current is actually flowing over the pilot wire 81G, whereas in the previous cases described, in the event of a fault occurring, no current is flowing over the pilot wire 81G. A breakage in the pilot wire would result in the magnets 79G and 89H being operated by the current flowing through their upper windings, that is, if the pilot wire broke at the same instant as the fault occurred. If the fault in the pilot wire occurred with a fault in another section, then the magnet 79G would operate and close the contact 78G so that the trip coil 77G would operate and trip the circuit breaker. If the current was flowing in the other direction, that is to say contacts 85H and 74G were closed, then exactly the same conditions would apply but the circuits are somewhat different owing to the two circuits not being perfectly symmetrical for instance the lower winding of magnet 79G would be energized by current flowing over the pilot wire but in this case the current would extend from earth, lower winding of magnet 89H, contacts 85H, battery 86H, pilot wire 81G, lower winding of magnet 79G, contacts 74G, to earth. This circuit is equivalent to the circuit considered above in connection with power flow in the reverse direction since the same or similar elements occur, although the order in which they occur is changed. It therefore follows that in the event of a fault occurring in the line 7G the batteries 76G and 86H would be connected in series and the conditions would be exactly equivalent to those already described.

Where a directional pair of relays, of the type dependent on voltage, is used there is a possibility of the relays failing to act due to the voltage falling to too low a value, for instance as might occur with a fault arising very near a station. On this account it is desirable to have a trip circuit operated by a low voltage release relay. With the arrangement shown, where current normally flows over the pilot wire, it is possible to provide a relay which will open the pilot wire circuit when the voltage falls below a predetermined margin. This voltage would usually be slightly greater than the gross value of volts with which a directional relay will operate, so that the low voltage release relay would come into operation just before the directional relays become inoperative. The voltage at which the low voltage release relays operate should preferably be less than the lowest possible voltage that can exist at any station other than those adjacent to the fault.

Figure 7:
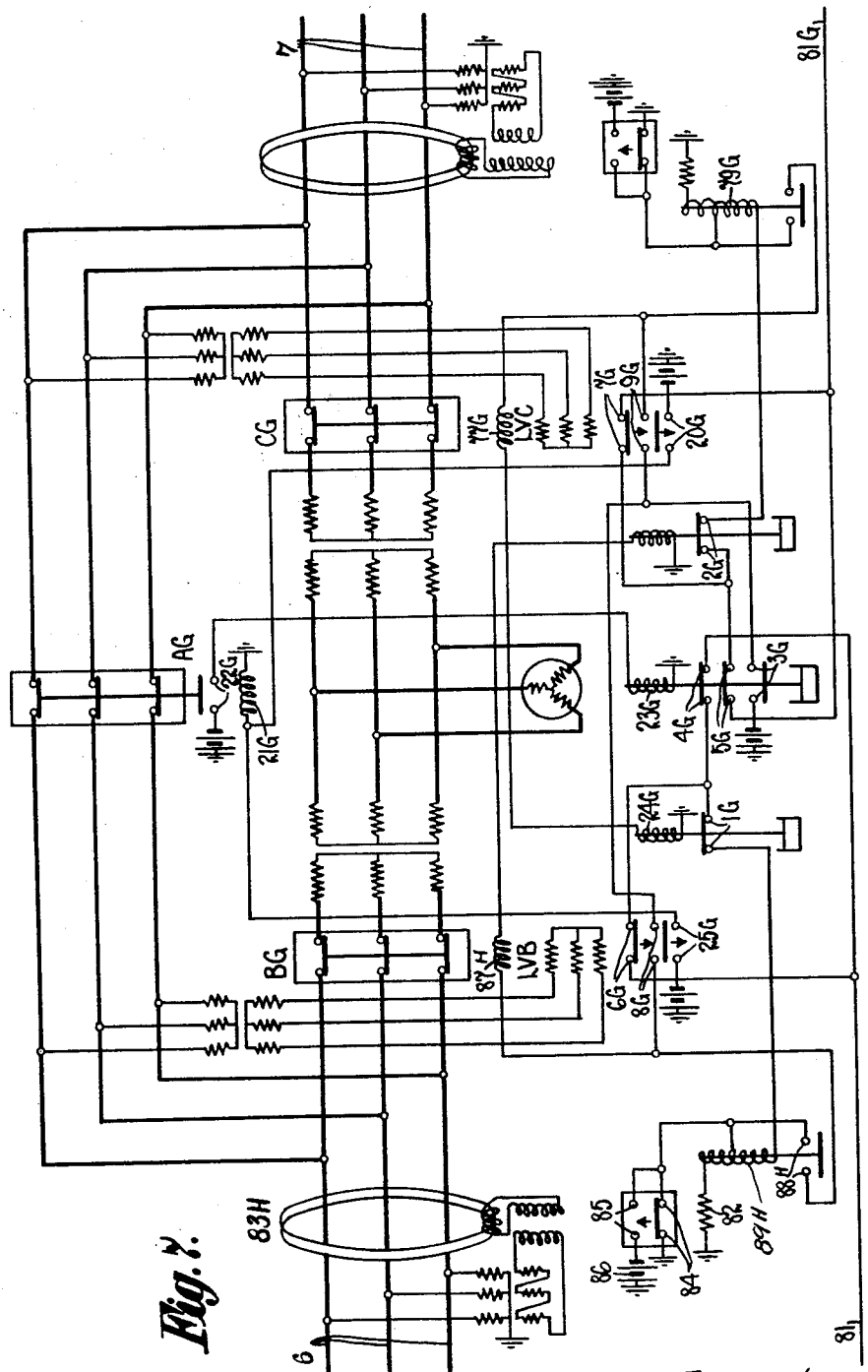
Figure 7 shows the application of a low voltage release relay to arrangements in which the opening of the pilot wire circuit in certain circumstances effects the isolation of the section.

One arrangement in which a low voltage release relay may be applied is shown in Figure 7. This arrangement consists of a modification of the apparatus at station G so that instead of the pilot wire 81 in Figure 5 being connected direct to the lower winding of the relay 89, such connection is made through contacts 4G and contacts 1G. Similarly the pilot wire 81G is not made direct to the lower winding of relay 79G but is made through contacts 5G and contacts 2G. It will be noted that the circuit of the pilot wire 81 can pass through contact 6G as well as 4G to contact 1G, while pilot wire 81G can pass through contact 7G as well as 5G to contact 2G. In this case power lines 6 and 7 are connected by a circuit-breaker AG, the power being fed from the busbars through inductive transformers and circuit-breakers BG and CG respectively to the power lines 6 and 7. It will be assumed that an earth fault occurs on section 7 and that it is of such a nature that the voltage falls so low that the low voltage release relay LVC de-energizes and opens contacts 7G, closing contacts 9G and 20G. At contact 20G a circuit is closed for the tripping coil 21G of the circuit-breaker AG. The circuit-breaker AG is accordingly tripped and contacts 22G are closed, thereby completing a circuit to operate relay 23G as follows: earth, battery, contact 22G, slow acting relay 23G to earth. After a short interval relay 23G energizes, opens contacts 4G and 5G and closes contacts 3G. At contacts 3G a circuit is completed as follows: earth, battery, contacts 3G, contacts 9G, tripping coil 77G of circuit-breaker CG, relay 24G to earth. Relay 24G is slow to energize but relay 77G energizes and trips the circuit-breaker CG. Contacts 5G and 7G open the circuit through the lower winding of relay 79G and the pilot wire and consequently as the directional relay 83H will be operated and relay 89H is caused to operate, a circuit is completed for the tripping coil 87H over contacts 83H and 85H. Tripping coil 87H operates and consequently the line 6 is isolated at circuit-breakers 71H, CG and AG. It will be noted that when the fault first occurs not only does the low voltage release relay LVC operate but the low voltage release relay LVB will also operate to close contact 25G in parallel with contacts 20G and also to open contacts 6G and close contacts 8G. As contact 4G is also opened it will be noted that the pilot wire circuit 81 will be open. Due, however, to the delay of the operation of the relay 23G and due to the presence of the inductive couplings between the power lines 6 and 7 and the busbars and the opening of circuit-breaker AG the voltage will rapidly rise on the non-faulty side, i. e., power line 6 so that the low voltage release relay LVB will again operate and close contact 6G before contact 4G is opened.

It should be noted that the above arrangement are applicable to any system which operates non-selectively with broken pilot wires. Contacts 1G and 2G could be operated by any current occurring as a result of a fault, for instance in the example shown they are operated by current flowing through the trip coils of the circuit-breakers BG and CG respectively. The contacts 1G and 2G control the circuits through the pilot wires 81 and 81G so that in the event of current in a trip coil failing for any reason to trip the switch the pilot wire on the side of the section distant from a fault is operated as was described in connection with Figure 3. It will be noted that contact 2G is arranged to open if circuit-breaker BG fails to operate and contact 1G is arranged to open if circuit-breaker CG fails to operate. This ensures that if the circuit-breakers will not operate to cut out the faulty section both the faulty section and the next adjacent section will be isolated.

In any of the circuits herein described it may be arranged that the tripping circuit is only completed when either the voltage drops to an agreed fraction of the normal value or when some other distinctive electrical conditon arises which is characteristic of a fault occurring at a short distance from the circuit-breaker. This may be achieved by arranging that a device which operates normally to keep the circuit of the tripping coil open, closes contacts in circuit with the tripping coil when the distinctive electrical condition arises. By this means the chances of false operation when the pilot wire is broken can be further reduced.

A description will now be given of protective arrangements controlled over a pilot wire on the lines of the "quadruplex" system of telegraphy. In the particular application to be described with reference to Figure 8 two sections of a system running between stations H and I are protected by a single pilot wire; other applications, some of which will be described later, also come within the spirit of the invention.

Referring to the said Figure 8, 1H and 2H represent two lines which require to be protected, while 3H represents a pilot wire to which quadruplex circuits are connected. At the station H end of the lines 1H and 2H, circuit-breakers 4H1 and 4H2 are shown and associated with these circuit-breakers are the tripping coils 5H1 and 5H2 respectively. At the station I end of the lines the circuit-breakers 4I1 and 4I2 are shown with their tripping coils 5I1 and 5I2 respectively. The directional relays 8H and 8I are provided for the line 1H, while directional relays 12H and 12I are provided for the line 2H. Two batteries, 6H and 7H, and 6I and 7I are provided at each end of the lines 1H and 2H, the batteries 7H and 7I being of comparatively low voltage compared with the voltage of batteries 6H and 6I, for example, one half of the voltage of batteries 6H and 6I, while separate batteries 10H and 10I are provided for the purpose of energizing the tripping coils. It will be noted that the connections to the pilot wire 3H at each end include a polarized differential relay 11H or 11I and a differential relay 9H or 9I respectively.

Each differential relay 9H and 9I is marginal, or in other words, it will operate only when the resultant magnetizing effect due to the combined effect of the two halves of the windings of the relay exceeds a predetermined value and if the said resultant magnetizing effect falls a certain amount below the predetermined value the relay automatically restores.

Each polarized differential relay 11H and 11I is responsive to the direction of the resultant ampere turns produced by currents flowing in its two windings. Thus if the currents flowing in the windings of relay 11H give a resultant magnetizing flux flowing upwards the relay is restrained, whilst if the currents give a resultant magnetizing current flowing downwards as shown the relay is operated. Similarly the relay 11I is restrained by a resultant magnetizing flux flowing upwards but is operated by a resultant magnetizing flux flowing in the reverse direction.

The directional relays 8H and 8I are normally in the position shown. If, however, current to which the relay is responsive flows into the line at the end at which the relay is situated the relay moves to the alternative position. The relay, moreover, when in the position shown makes battery 7H or 7I only effective, but when in the alternative position makes battery 6H or 6I effective also and bridges a gap in a tripping circuit.

The directional relays 12H and 12I are normally in the position shown and are similarly influenced by current flowing in the line 2H and when a relay 12H or 12I is moved to its alternative position it reverses the effective connections of the associated battery 7H or 7I or of the associated batteries 7H or 7I and 6H or 6I.

A description of the operation of the arrangement shown in Figure 8 will depend upon whether the directional relays are dependent for their operation upon balanced current or upon residual current. In the case of their being dependent upon balanced current for their operation according to the direction of current flow, which is of course vectorial in the case of alternating current, one of the relays associated with each line would be normally operated. In the case of residual current neither of the directional relays associated with a section of line would be normally operated but in the event of a fault in the section both would be operated, while in the case of a fault in some other section one would be operated and one not operated. As the circuits to be described where directional relays operated with balanced currents are employed will be the same as those which arise when a relay operated with residual current is used, although occurring in somewhat different conditions, it will be sufficient to describe the circuits for relays of the latter type as the operation in the former case can then be readily followed.

If the directional relay 8H is operated to open its contacts 36H and 37H and to close its contacts 38H and 39H and 40H and 41H and at the same time the adjacent relay 9H is operated to close contacts 52H and 53H a tripping circuit is made from the positive pole of battery 10H through contacts 53H, 52H, 41H and 40H, and trip coil 5H1 to the negative pole of the battery, with the result that the associated circuit-breaker 4H1 is opened. Similarly if directional relay 8I and the relay 9I are both operated at the same time the circuit-breaker 4I1 is tripped out.

If the directional relay 12H is operated to open contacts 42H and 43H and contacts 46H and 47H and to close contacts 44H and 45H and contacts 48H and 49H and contacts 50H and 51H and at the same time the adjacent relay 11H is operated to close contacts 54H and 55H a tripping circuit is made from the positive pole of battery 10H through contacts 54H, 55H, 51H and 50H, and trip coil 5H2 to the negative pole of the battery, with the result that the associated circuit-breaker 4H2 is opened. Similarly if directional relay 12I and the relay 11I are both operated at the same time the circuit-breaker 4I2 is tripped out.

In Figure 8 the relays are shown in the positions assumed when there is no fault current flowing either in the line 1H or in the line 2H and it will be noted that when the relays are in the positions shown circuits may be traced as follows: from (1) earth, resistance 13H, lower winding of polarized differential relay 11H, lower winding of differential relay 9H, contacts 47H, 46H, 37H, 36H, positive pole of battery 7H which has its negative pole connected to earth through contacts 42H and 43H. (2) Earth, resistance 13I, lower winding of polarized differential relay 11I, lower winding of differential relay 9I, contacts 31I, 30I, 21I, 20I, positive pole of battery 7I which has its negative pole connected to earth through contacts 26I and 27I. It will be noted that the pilot wire is connected at station H over the upper windings of relays 11H and 9H to the positive pole of battery 7H over contacts 47H, 46H, 37H, 36H and at station I over the upper windings of the relays 11I and 9I to the positive pole of batteries 7I over contacts 31I, 30I, 21I and 20I.

The result is that no current flows over the pilot wire 3H nor through the upper windings of relays 9H and 11H and the upper windings of relays 9I and 11I, since the batteries 7H and 7I are of equal voltage and are connected in opposition to one another. The current flowing from the batteries 7H and 7I in the circuits above described is insufficient to operate the relays 9H and 9I and flows in the wrong direction to operate the relays 11H and 11I. The relays 9H, 9I, 11H and 11I therefore remain unoperated.

If a fault occurs on a station to the left of station H directional relays 8I and 12I are operated while the directional relays 8H and 12H remain in the position shown. In these circumstances the following circuits may be traced:

(1) Earth, contacts 33I, 32I, 23I, 22I, positive pole of battery 6I, battery 6I, battery 7I, contacts 28I, 29I, lower winding of relay 9I, lower winding of relay 11I, resistance 13I to earth.

The circuits for the lower windings of relays 9H and 11H remain as originally described.

In addition there will be a flow of current over the pilot wire 3H in the following circuit:

(2) Earth, contacts 33I, 32I, positive pole of battery 6I, battery 6I, battery 7I, contacts 28I, 29I, upper windings of relays 9I, 11I, pilot wire 3H, upper windings of relays 11H and 9H, contacts 47H, 46H, 37H, 36H, positive pole of battery 7H, battery 7H, contacts 42H and 43H to earth. In this circuit the batteries 6I, 7I and 7H are connected in series all assisting each other so that the current flowing over the pilot wire and through the upper windings of relays 9I, 11I, 11H and 9H is proportional to the sum of the voltage of these batteries. The direction of current flow in the pilot wire will be assumed to be from positive to negative and in this case would be from station H to station I.

The resultant effect as regards each of the relays 9H, 11H, 11I and 9I will be considered.

In relay 9H the current through the lower winding depends upon the voltage of battery 7H. The current through the upper winding which has an opposing effect to the current in the lower winding will be dependent upon the sum of the voltages 6I, 7I and 7H. The resistances 13H and 13I are compensating resistances which balance the resistance of the pilot wire and the upper windings of the relays at the other end of the pilot wire so that the currents will always be in the same proportion to the voltages in the respective circuits and as the voltage of batteries 7I and 7H are approximately equal as also the voltage of batteries 6H and 6I, it will be seen that the current through the upper winding of relay 9H will be sufficiently greater than the current through the lower winding as to cause relay 9H to operate. In relay 11H the current through the upper winding will exceed the current through the lower winding exactly the same amount as with relay 9H but as the exciting current flows upwards through the lower winding and downwards through the upper winding the current through the upper winding predominates and consequently the direction of resultant magnetic flux will be downwards and relay 11H will operate.

In relay 11I the current through the upper winding which is of the same magnitude as that flowing through the upper windings of relays 9H and 11H is proportionate to the sum of the voltages of batteries 7H, 6I and 7I and flows upwards. The current through the lower winding is proportional to the sum of the voltages of batteries 6I and 7I and flows downwards. The current through the lower winding is proportional to the sum of the voltages of batteries 6I and 7I and flows downwards. It follows therefore, that the resultant magnetic flux will be upwards and proportional to the difference, i. e., the voltage of the battery 7H. Consequently there is no change in the direction or magnitude of the flux in relay 11I, therefore relay 11I remains in the position shown.

In relay 9I the currents in the upper and lower windings are exactly the same as the currents in the upper and lower windings of relay 11I respectively and consequently the resultant magnetic flux is also unchanged and relay 9I remains in the position shown.

Relay 9H connects contacts 52H and 53H but this is without effect as contacts 40H and 41H are disconnected. Similarly the relay 11H connects contacts 54H and 55H but this also is without effect as contacts 50H and 51H are open.

In the case of a fault on a section to the right of station I, exactly similar operations will take place but in this case relays 8H, 12H, 11I and 9I will be operated, that is to say, the relays at one station corresponding to those relays at the other station which were operated in the last mentioned case will now be operated in their place as will be readily understood.

In the case of an earth fault on line 1H power will flow to the fault from both station H and station I. Consequently both relays 8H and 8I will operate.

Exactly what will happen on line 2H in these circumstances is difficult to forecast and actually it is possible that the earthed current may flow either from station H to station I and so help to feed power to the fault from station I or it may flow from station I to station H and help to feed power to the fault from station H. While it may happen that actually no earth current at all flows along line 2H. In one case relay 12H will be operated; in the second case relay 12I will be operated, while in the third case neither relays 12H nor 12I will be operated. Each case will be dealt with in turn.

Firstly with relays 8H, 8I and 12H operated and relay 12I unoperated, the following circuits may be traced:

(1) Earth, contacts 49H, 48H, 39H, 38H, positive pole of battery 6H, battery 6H, battery 7H, contacts 44H, 45H, lower winding of relays 9H and 11H resistance 13H to earth.

(2) Earth, contacts 27I, 26I, negative pole of battery 7I, battery 7I, battery 6I, contacts 22I, 23I, 30I, 31I, lower windings of relays 9I and 11I, resistance 13I to earth.

(3) Earth, contacts 49H, 48H, 39H, 38H, positive pole of battery 6H, battery 6H, battery 7H, contacts 44H, 45H, upper windings of relays 9H and 11H, pilot wire 3H, upper windings of relays 11I, 9I, contacts 31I, 30I, 23I, 22I, positive pole of battery 6I, battery 6I, battery 7I, contacts 26I, 27I earth.

The current through the lower winding of relay 9H is consequently upwards; in the lower winding of relay 11H it is downwards and its value is proportional to the voltage of batteries 6H and 7H together. The current through the upper windings of relay 9H is downwards, and through the upper winding of relay 11H upwards, while its value is proportional to the sum of the voltage of the batteries 6H, 7H, 6I, 7I. Consequently the effect of the current through the upper winding of relay 9H will predominate over the effect of the current through the lower winding to an extent sufficient to cause relay 9H to operate. Also, as the effect of the current through the upper winding of relay 11H is greater than the effect of current through the lower winding, the resultant magnetic flux will be upwards and relay 11H will not operate.

The current through the lower winding of relay 11I will be proportional to the sum of voltage of the batteries 6I and 7I and its direction will be upwards. As the current through the upper winding is downwards but greater, being proportional to the sum of the voltages of the batteries 6H, 7H, 6I, 7I, the relay 11I will operate. The current through the upper winding of relay 9I will exceed the current through the lower winding by an amount proportional to the voltage of the batteries 6H and 7H which is sufficient to cause relay 9I to operate.

Under these conditions therefore circuits may be traced as follows:

(1) Negative pole of battery 10H, tripping coil 5H1, contacts 40H, 41H, 52H, 53H to positive pole of battery 10H.

(2) Negative pole of battery 10I, tripping coil 5I1, contacts 24I, 25I, 56I, 57I to positive pole of battery 10I.

Consequently circuit-breakers 4H1 and 4I1 will be tripped and the power line 1H cut out of service. It will be noted that the circuit of the tripping coils 5H2 and 5I2 are open at contacts 54H and 55H and contacts 35I and 34I respectively, so that the power line 2H is not affected.

Secondly, with relays 8H, 8I and 12I operated and 12H unoperated the following circuits may be traced:

(1) Earth, contacts 43H, 42H, negative pole of battery 7H, battery 7H, battery 6H, contacts 38H, 39H, 46H, 47H, lower windings of relays 9H and 11H, resistance 13H to earth.

(2) Earth, contacts 33I, 32I, 23I, 22I, positive pole of battery 6I, battery 6I, battery 7I, contacts 28I, 29I, lower windings of relays 9I, and 11I, resistance 13I to earth.

(3) Earth, contacts 43H, 42H, negative pole of battery 7H, battery 7H, battery 6H, contacts 38H, 39H, 46H, 47H, upper windings of relays 9H and 11H, pilot wire 3H, upper windings of relays 11I and 9I, contacts 29I, 28I, negative pole of battery 7I, battery 7I, battery 6I, contacts 22I, 23I, 32I, 33I earth.

The current through the lower windings of relays 9H and 11H will be proportional to the sum of the voltages of the batteries 6H and 7H and will be downwards in the lower winding of relay 9H and upwards in the lower winding of relay 11H. The current through the upper windings of relays 9H and 11H will be proportional to the sum of the voltages of the batteries 6H, 7H, 6I and 7I and will be upwards in the upper winding of relay 9H and downwards in the upper winding of relay 11H. The difference between the effects of the two windings will be sufficient to operate relay 9H while the resultant direction of magnetic flux in relay 11H will be downwards so that this relay will also operate. The current through the upper windings of relays 11I and 9I is also of a value proportional to the sum of the voltages of the batteries 6H, 7H, 6I and 7I, while the current through their lower windings is of a value proportional to the sum of the voltages of the batteries 6H and 7H. As the direction of current flow is upwards in the upper winding of relay 11I and downwards in the lower winding, the resultant magnetic flux will be upwards and relay 11I will not operate. In relay 9H, the effect of the current in the upper winding is reduced by the effect of the current in the lower winding but the difference being proportional to the sum of the voltages of batteries 6H and 7H will cause relay 9H to operate. Under these conditions circuits may be traced as follows:

(1) Negative pole of battery 10H, tripping coil 5H1, contacts 40H, 41H, 52H, 53H, positive pole of battery 10H.

(2) Negative pole of battery 10I, tripping coil 5I1, contacts 24I, 25I, 56I, 57I, positive pole of battery 10I.

Consequently in this case also circuit-breakers 4H1 and 4I1 will be tripped and the power line 1H cut out of service. It will be noted that the circuits of the tripping coils 5H2 and 5I2 are open at contacts 50H and 51H and contacts 58I and 59I respectively, so that the power line 2H is not affected.

Thirdly, relays 8H and 8I are operated but neither the relay 12H nor 12I is operated.

The following circuits may be traced:

(1) Earth, contacts 43H, 42H, negative pole of battery 7H, battery 7H, battery 6H, contacts 38H, 39H, 46H, 47H, lower windings of relays 9H and 11H, resistance 13H to earth.

(2) Earth, contacts 27I, 26I, negative pole of battery 7I, battery 7I, battery 6I, contacts 22I, 23I, 30I, 31I, lower windings of relays 9I and 11I, resistance 13I to earth.

(3) Earth, contacts 43H, 42H, negative pole of battery 7H, battery 7H, battery 6H, contacts 38H, 39H, 46H, 47H, upper windings of relays 9H and 11H, pilot wire 3H, upper windings of relays 11I and 9I, contacts 31I, 30I, 23I, 22I, positive pole of battery 6I, battery 6I, battery 7I, contacts 26I, 27I, earth.

In this latter circuit it will be noted that the batteries 6I and 7I are connected in opposition to the batteries 6H and 7H. Consequently no current will flow over the pilot wire. As the current in the lower winding of relay 9H is proportional to the sum of the voltages of the batteries 6H and 7H, relay 9H will operate but as the current in the lower winding of relay 11H is upwards relay 11H will not operate. Similarly the current in the lower winding of relay 11I will be upwards so that relay 11I will not operate and the current in the lower winding of relay 9I will be proportional to the sum of the voltages of the batteries 6I and 7I consequently relay 9I will operate.

Under these conditions circuits will be completed as follows:

(1) Negative pole of battery 10H, tripping coil 5H1, contacts 40H, 41H, 52H, 53H positive pole of battery 10H.

(2) Negative pole of battery 10I, tripping coil 5I1, contacts 24I, 25I, 56I, 57I, positive pole of battery 10I.

Consequently in this case also circuit-breakers 4H1 and 4I1 will be tripped and the power line 1H cut out of service.

It will be noted that the circuits of the tripping coils 5H2 and 5I2 are open at contacts 50H, 51H, 54H and 55H and at contacts 58I, 59I, 35I, 34I respectively, so that the power line 2H is not affected. It will thus be seen that, irrespective of the direction of earth current flow in the line 2H, the line 2H will not be affected by a fault in the line 1H.

It will now be assumed that a fault occurs in the line 2H, then earth current will flow to the fault from both ends of the section so that relays 12H and 12I are both operated. The direction of flow of fault current in power line 1H may be either from station H to station I, from station I to station H, or there may be no flow at all. In one case relay 8H will be operated and relay 8I not operated; in the second case relay 8I will be operated and relay 8H not operated and in the third case neither relay 8H nor 8I will be operated. Dealing with the first case in which relays 12H, 12I, 8H, are operated and relay 8I unoperated, the following circuits may be traced:

(1) Earth, contacts 49H, 48H, 39H, 38H, positive pole of battery 6H, battery 6H, battery 7H, contacts 44H, 45H, lower windings of relays 9H and 11H, resistance 13H to earth.

(2) Earth, contacts 33I, 32I, 21I, 20I, positive pole of battery 7I, battery 7I, contacts 28I, 29I, lower windings of relays 9I, and 11I, resistance 13I to earth.

(3) Earth, contacts 49H, 48H, 39H, 38H, positive pole of battery 6H, battery 6H, battery 7H, contacts 44H, 45H, upper windings of relays 9H and 11H, pilot wire 3H, upper windings of relays 11I and 9I, contacts 29I, 28I, negative pole of battery 7I, battery 7I, contacts 20I, 21I, 32I, 33I earth. The current through the lower winding of relay 9H will be upwards and of a value proportional to the voltage of the batteries 6H and 7H. The current through the upper winding of relay 9H will be downwards and proportional to the difference between the sum of the voltages of batteries 6H and 7H and the voltage of the battery 7I. The resultant effect of the two windings will thus be proportional to the voltage of the battery 7I, i. e., insufficient to effect the operation of relay 9H which accordingly will not operate.

The current through the upper winding of relay 11H will be upwards, while the current through the lower winding will be downwards. The resultant effect is therefore downwards and proportional in value to the voltage of the battery 7I. The direction of current is therefore such as to cause relay 11H to operate.

Relay 11I will have current flowing in a downwards direction in its lower winding proportional to the voltage of the battery 7I, while the current in its upper winding is downwards and proportional to the difference between the sum of the voltages of batteries 6H and 7H and the voltage of the battery 7I. The resultant effect is therefore downwards and proportional to the sum of the voltages of batteries 6H and 7H. Relay 11I therefore operates. Relay 9I will also have an excitation proportional to the sum of the voltages of the batteries 6H and 7H and accordingly this relay also operates.

The following circuits will therefore be completed:

(1) Negative pole of battery 10H, tripping coil

5H2, contacts 50H, 51H, 55H, 54H, positive pole of battery 10H.

(2) Negative pole of battery 10I, tripping coil 5I2, contacts 34I, 35I, 59I, 58I, positive pole of battery 10I. Consequently both the circuit-breakers 4H2 and 4I2 are tripped and the faulty line 2H cut out. It will be noted that the circuits of the tripping coils 5H1 and 5I1 are open at contacts 52H and 53H and contacts 24I and 25I respectively.

In the second case relays 12H, 12I, 8I are operated and 8H unoperated.

The following circuits may be traced:

(1) Earth, contacts 49H, 48H, 37H, 36H, positive pole of battery 7H, battery 7H, contacts 44H, 45H, lower windings of relays 9H and 11H, resistance 13H to earth.

(2) Earth, contacts 33I, 32I, 23I, 22I, positive pole of battery 6I, battery 6I, battery 7I, contacts 28I, 29I, lower windings of relays 9I and 11I resistance 13I to earth.

(3) Earth, contacts 49H, 48H, 37H, 36H positive pole of battery 7H, battery 7H, contacts 44H, 45H, upper windings of relays 9H and 11H, pilot wire 3H, upper windings of relays 11I and 9I, contacts 29I, 28I, negative pole of battery 7I, battery 7I, battery 6I, contacts 22I, 23I, 32I, 33I earth. The current through the lower winding of relay 9H is upwards and is proportional to the voltage of the battery 7H. The current through the upper winding of relay 9H is also upwards and is proportional to the sum of the voltages of the batteries 7I and 6I less the voltage of the battery 7H, so that the resultant effect is proportional to the sum of the voltages of the batteries 7I and 6I consequently relay 9H operates.

The current through the upper and the lower windings of relay 11H is downwards so that relay 11H operates.

The current through the upper winding of relay 11I is upwards and is proportional to the sum of the voltages of batteries 7I and 6I less the voltage of the battery 7H, while the current through the lower winding of relay 11I is downwards and is proportional to the sum of the voltages of batteries 7I and 6I. The resultant effect is therefore downwards and is proportional to the voltage of the battery 7H. Consequently relay 11I operates.

As the direction of currents in the upper winding of relay 9I is downwards and the direction of current in the lower winding of relay 9I is upwards, the resultant effect will be proportional to the voltage of battery 7H and therefore insufficient to enable relay 9I to operate.

The following circuits will therefore be completed:

(1) Negative pole of battery 10H, tripping coil 5H2, contacts 50H, 51H, 55H, 54H, positive pole of battery 10H.

(2) Negative pole of battery 10I, tripping coil 5I2, contacts 34I, 35I, 59I, 58I positive pole of battery 10I.

Consequently both the circuit-breakers 4H2 and 4I2 are tripped and the faulty line 2H cut out.

It will be noted that the circuits of the tripping coils 5H1 and 5I1 are open at contacts 40H and 41H and contacts 57I and 56I respectively. Consequently the line 1H is unaffected.

In the third case relays 12H and 12I are operated and relays 8H and 8I unoperated.

The following circuits may be traced:

(1) Earth, contacts 49H, 48H, 37H, 36H, positive pole of battery 7H, battery 7H, contacts 44H, 45H, lower windings of relays 9H and 11H resistance 13H to earth.

(2) Earth, contacts 33I, 32I, 21I, 20I, positive pole of battery 7I, battery 7I, contacts 28I, 29I, lower windings of relays 9I and 11I, resistance 13I to battery.

(3) Earth, contacts 49H, 48H, 37H, 36H, positive pole of battery 7H, battery 7H, contacts 44H, 45H, upper windings of relays 9H and 11H, pilot wire 3H, upper winding of relays 11I and 9I, contacts 29I, 28I, negative pole of battery 7I, battery 7I, contacts 20I, 21I, 32I, 33I earth.

Under these conditions there will be no current on the pilot wire and the upper windings of relays 9H, 11H, 11I and 9I so that their operation depends entirely on currents in the lower windings. The current in the lower winding of relay 9H will be proportional to the voltage of the battery 7H, so that relay 9H will not operate. The current in the lower winding of relay 11H will be downward, so that relay 11H will operate. The current in the lower winding of relay 11I will be downward so that relay 11I will operate.

The magnitude of the current in the lower winding of relay 9I will be proportional to the voltage of the battery 7I so that relay 9I will not operate.

Circuits will therefore be completed as follows:

(1) Negative pole of battery 10H, tripping coil 5H2, contacts 50H, 51H, 55H, 54H, negative pole of battery 10H.

(2) Negative pole of battery 10I, tripping coil 5I2, contacts 34I, 35I, 59I, 58I, positive pole of battery 10I.

Consequently both the circuit-breakers 4H2 and 4I2 are tripped and the faulty line 2H cut out. It will be noted that the circuits of the tripping coils 5H1 and 5I1 are open at contacts 40H and 41H and 52H and 53H and contacts 25I and 24I and 57I and 56I respectively so that line 1H is not affected.

There is one other possibility and that is, that earth fault may occur on both the lines 1H and 2H simultaneously. In this event the directional relays 8H, 8I, 12H, 12I would all operate and circuits could be traced as follows:

(1) Earth, contacts 49H, 48H, 39H, 38H, positive pole of battery 6H, battery 6H, battery 7H, contacts 44H, 45H, lower windings of relays 9H and 11H, resistance 13H to earth.

(2) Earth, contacts 3I, 32I, 23I, 22I, positive pole of battery 6I, battery 6I, battery 7I, contacts 28I, 29I, lower windings of relays 9I and 11I, resistance 12I to earth.

(3) Earth, contacts 49H, 48H, 39H, 38H, positive pole of battery 6H, battery 6H, battery 7H, contacts 44H, 45H, upper windings of relays 9H and 11H, pilot wire 3H, upper windings of relays 11I and 9I, contacts 29I, 28I, negative pole of battery 7I, battery 7I, battery 6I, contacts 22I, 23I, 32I, 33I, earth.

It will be seen in this latter circuit that the batteries 6H and 7H oppose the batteries 6I and 7I so that no current flows on the pilot wire, consequently the operation of the relays is determined solely by the current flowing in the lower windings.

Now the magnitude of current flowing in the lower winding of relay 9H is proportional to the sum of the voltages of the batteries 6H and 7H so that relay 9H operates.

Again the direction of current flowing in the lower winding of relay 11H is downwards so that relay 11H operates. The direction of current flowing in the lower winding of relay 11I is also downwards so that relay 11I operates. The magnitude of current flowing in the lower winding of relay 9I is proportional to the sum of the voltages of the batteries 6I and 7I so that relay 9I operates.

It will thus be seen that the following circuits are completed:

(1) Negative pole of battery 10H, tripping coil 5H1, contacts 40H, 41H, 52H, 53H, positive pole of battery 10H.

(2) Negative pole of battery 10H, tripping coil 5H2, contacts 50H, 51H, 55H, 54H, positive pole of battery 10H.

(3) Negative pole of battery 10I, tripping coil 5I1, contacts 24I, 25I, 56I, 57I, positive pole of battery 10I.

(4) Negative pole of battery 10I, tripping coil 5I2, contacts 34I, 35I, 59I, 58I, positive pole of battery 10I.

Consequently the tripping coils 5H1, 5H2, 5I1, 5I2, are all operated and the circuit-breakers 4H1, 4H2, 4I1, 4I2 are all tripped and both the power lines 1H and 2H cut out.

It will be noted that in every example given above the following relationships exist:

Relay 9H is operated or not according as relay 8I is operated or not.

Relay 11H is operated or not according as relay 12I is operated or not.

Relay 9I is operated or not according as relay 8H is operated or not.

Relay 11I is operated or not according as relay 9I is operated or not and this is true in every case which is theoretically possible.

Consequently it has been thought sufficient to only consider those examples already dealt with which are those most likely to occur in practice.

In any of the above eventualities it may happen that the pilot wire is broken and consideration will now be given to what will happen in this event.

Under normal conditions as there is normally no current on the pilot wire nothing will happen when the pilot wire breaks. If however, the pilot wire is broken when a fault occurs to the left of station H, then as directional relays 8I and 12I are operated the current through the lower winding of relay 9I will be of a magnitude sufficient to operate it, while the current through the lower winding of relay 11I will be downwards, so that relay 11I will operate.

Circuits will therefore be completed as already traced for tripping coils 5I1 and 5I2; consequently circuit breakers 4I1 and 4I2 are tripped and the lines 1H and 2H cut out at their righthand end so cutting off the supply of power from station I and beyond. Similarly, if the fault occurs to the right of station I, directional relays 8H and 12H will operate, as also relays 9H and 11H. Consequently tripping coils 5H1 and 5H2 will operate to trip circuit-breakers 4H1 and 4H2 respectively, so cutting off the supply of power from station H and beyond.

If a fault occurs in line 1H directional relays 8H and 8I will operate and one or other of the directional relays 12H and 12I or possibly neither.

Referring to the circuits already described, it will be noted that under the first of these conditions, i. e., directional relay 12H operated with a broken pilot wire 3H, relays 9H, 11H and 9I will operate so that circuit-breakers 4H1, 4H2 and 4I1 will operate. Consequently not only will a faulty section be cut out but also the supply of power from station H and beyond.

Under the second condition i. e., directional relay 12I operated and a broken pilot wire, relays 9H, 11I and 9I will operate so that circuit-breakers 4H1, 4I1 and 4I2 will operate. Consequently not only will the faulty section be cut out but also the supply of power from station I and beyond.

Under the third condition, i. e., neither relay 12H nor 12I operated and a broken pilot wire, relays 9H and 9I will alone be operated, so that circuit-breakers 4H1 and 4I1 will operate and cut out the faulty section.

Consequently it is immaterial whether the pilot wire is whole or not; in the case of a fault the protective system will work.

If a fault occurs on line 2H, directional relays 12H and 12I will operate and one or other of the directional relays 8H and 8I will operate, or possibly neither.

Referring to the circuits already described it will be noted that under the first of these conditions, i. e., directional relay 8H operated and the pilot wire 3H broken, relays 9H, 11H and 11I will be operated so that circuit-breakers 4H1, 4H2 and 4I2 are tripped. Consequently not only will the faulty section be cut out but also the supply of power for station H and beyond.

Under the second condition, i. e., directional relay 8I operated and a broken pilot wire 3H, relays 11H, 11I and 9I will be operated so that circuit-breakers 4H2, 4I1, 4I2 will be tripped. Consequently not only will the faulty section be cut out but also the supply of power for station I and beyond.

Under the third condition neither relay 9H nor 8I operated and a broken pilot wire, relays 11H and 11I will alone be operated and circuit-breakers 4H2, 4I2 will be tripped to isolate the faulty line only. In the case of an earth fault on both the lines 1H and 2H and a broken pilot wire the directional relays 8H and 8I, 12H and 12I will be operated and it will be seen from the circuits previously traced that the relays 9H, 11H, 9I, 11I all operate and the circuit-breakers 4H1, 4H2, 4I1, 4I2 are all tripped as before so that in every case considered it will be seen that even if the pilot wire is broken the protective system operates correctly and, further, that the single pilot wire 3H serves to protect both of the lines 1H and 2H.

It will be appreciated that in cases where it is not desirous to protect two lines such as 1H and 2H, it is possible to utilize one of the pairs of relays 8H and 8I or 12H and 12I for controlling the transmission of signals as the transmission of such signals will be without effect on the other pair of relays. The controlling keys for sending such signals would have contacts arranged similarly to the contacts of relays 8H and 8I or 12H and 12I and of course it will be appreciated that signals can be sent in either direction. This feature is illustrated in Figure 11 where the signals are transmitted over one of the pairs of relays D and PD whenever the current at either end of the line section changes in value. In power distribution systems it is highly desirable to cut down the number of pilot wires to a minimum and in the present invention whereby it is possible to use the pilot wire for two purposes a distinct saving is effected.

It may be mentioned that in Figure 8 the operations of relays 8H and 8I, 12H and 12I are described as due to increases of current but it could be arranged that they would operate with decreases of current.

In the arrangements so far described it has been assumed that power is supplied from both ends of a section to the fault but in certain cases power is supplied to a station such as station J and no power is supplied from the station. An arrangement will now be described for cutting out a faulty section in the event of current flowing in at one end of a section and, either current less than a predetermined value flowing out at the other end, or current flowing in at the other end. This is satisfactory in the case of all faults which cause the voltage to drop to nearly zero. One way of carrying this into effect will be described with reference to Figure 9, which is a modification of Figure 5. In Figure 9; 1, 2, 3 represent the section of a three-phase transmission line between stations I and J; CB1 and CB2 represent the circuit-breakers at opposite ends of the section; OL1 and OL2 represent over-current relays, that is to say relays which operate when the current flowing through them exceeds a certain predetermined amount. These relays are of known type and are arranged so that an excess of current flowing past the relays in any one or more of the lines 1, 2 or 3 will cause the contacts 5 and 7 to open and 6 and 8 to close. DR1 and DR2 represent directional relays and are arranged to close contacts 9 and 11 both when no power is flowing and when power is flowing past the relays into the section and to close contacts 10 and 12 when power above a predetermined magnitude less than the predetermined amount necessary to operate the over-current relays is flowing past the respective relays in the other directions; 13 represent the pilot wire; TC1 and TC2 represents the tripping coils of the circuit-breakers CB1 and CB2 respectively; D1 and D2 represent the differential relays arranged for duplex working in the manner described in connection with Figure 5; 14 and 15 represent contacts in the pilot wire circuit controlled by the tripping coils TC1 and TC2 respectively. The figure shows the condition with no current flowing at all in the leads 1, 2 or 3. In this condition no circuits are closed. The following table indicates the position taken up by the relays OL1, DR1, D1, OL2, DR2, D2 under various conditions on the line:

| Conditions on line | Position of relays | | | | | |
|---|---|---|---|---|---|---|
|  | OL1 | DR1 | D1 | OL2 | DR2 | D2 |
| 1. Straight through overload current from left to right | Down | Down | Up | Down | Up | Down. |
| 2. Straight through overload current from right to left | ---do--- | Up | Down | ---do--- | Down | Up. |
| 3. Fault on line fed from both ends with voltage either up or down to nearly zero. | ---do--- | Down | ---do--- | ---do--- | ---do--- | Down. |
| 4. Fault on line fed from left end only | ---do--- | ---do--- | Up | Up | ---do--- | Do. |
| 5. Fault on line fed from right end only | Up | ---do--- | Down | Down | ---do--- | Up. |

In the first case i. e., straight through current flowing from left to right, it will be noted that a circuit may be traced as follows: earth, battery, contacts 9, 6 to midpoint of winding of relay D1. Here the current divides, one half proceeding via the upper winding of relay D1, resistance 16 to earth, the other half proceeding via the lower winding of relay D1, contact 14, pilot wire 13, contact 15, lower winding of differential relay D2, contact 12 to earth. Relay D2 is energized and contact 19 is closed. This however is without effect as contact 11 of relay DR2 is open.

Under the second condition with straight through current flowing through from right to left it will be noted that the condition is substantially the same as in the preceding case, the only difference being in the position of relays DR1, D1, DR2 and D2.

Referring to the third case in which a fault on the line is fed from both ends whatever the volts may be, i. e., either up or right down then both the relays DR1 and DR2 will be down. Similarly OL1 and OL2 will have their armatures down. Consequently contacts 9 and 6 will be closed at one end and 11 and 8 at the other. The midpoint of the differential relay in each case will therefore be connected to the same potential as follows: earth, battery, contact 9, contact 6 to the midpoint of relay D1. Earth, battery, contact 11, contact 8 and to the midpoint of relay D2. Consequently there would be no current on the pilot wire. Current will, however, flow through the upper windings of relays D1 and D2 through the resistances 16 and 17 respectively to earth. Consequently both these relays will be energized and contacts 18 and 19 closed. Circuits will therefore be completed for the tripping coils TC1 and TC2 as will be readily appreciated and the circuit-breaker CB1 and CB2 will therefore be brought out. In this way the section is isolated. At the same time the contacts 14 and 15 will be opened but this is without effect in this particular case.

Conditions 4 and 5 are reciprocal and it is only necessary to consider one and for this purpose the condition will be considered where the fault on the line is fed from the lefthand end only. Under these conditions OL1 will be down, DR1 will be down, OL2 will be up and DR2 will be down. The circuit over the pilot wire can therefore be traced as follows: earth, battery, contact 9, contact 6, lower winding of relay D1, contact 14, pilot wire 13, contact 15, lower winding of relay D2, contact 7 to earth. Relay D1 will also receive a current through its upper winding and resistance 16 to earth in a branch of the above circuit. Consequently relay D1 will not be energized while relay D2 will be energized. The closure of contact 19 completes a circuit for the tripping coil TC2 as follows: earth, battery, contact 11, contact 19 winding of tripping coil TC2 to earth. The tripping coil energizes and trips the circuit-breaker CB2 at the same time opening contact 15. The opening of contact 15 breaks the circuit through the pilot wire and therefore relay D1 becomes excited through its upper winding only and therefore energizes and closes contact 18. Tripping coil TC1 therefore energizes as follows: battery, contact 9, contact 18, tripping coil TC1, to earth. Tripping coil TC1 energizes and cuts out the circuit-breaker CB1 and also opens contact 14. In this way the section is isolated. It will be clear that all that is necessary to cause the circuit-breaker CB1 to trip is to change the current in the pilot wire sufficiently whether up or down or, by reversal, to cause the balance in the windings of the differential relay D1 to be upset and cause relay D1 to energize. Hence the interruption of the pilot wire by contact 15 must only be considered as one example of carrying the invention into effect.

In practice it may happen that there are considerable fluctuations in power and, where power may be fed from either end of the line, actual reversals in direction. In order to ensure that no faulty operation will take place it becomes desirable therefore to ensure that the directional relays DR1 and DR2 are more sensitive than the over-current relays OL1 and OL2. This may be done by providing a sufficient margin of current so that OL1 will not operate in case of a reversal of direction until the current has reached a larger value than is necessary to operate relay DR1. The same remarks of course apply to relays OL2 and DR2. It will thus be appreciated that by means of the arrangement shown a very practicable way has been found for obtaining the object of the invention.

Figure 10 shows the circuit arrangements of Figure 9 in more detail so that they can be readily understood. In this figure the circuit-breakers CB1 are provided with auxiliary contacts 1, 2, 3, 4 and 5, in addition to the main contacts 6, 7, 8; while the circuit-breakers CB2 are similarly provided with auxiliary contacts 9, 10, 11, 12, 13 in addition to the main contacts 14, 15, 16; the auxiliary contacts 1 and 2 and 9 and 10 are arranged to be closed before the main contacts as these connect up the protective arrangements as will be understood from the further description. The three-phase power lines are represented by the reference L1, L2, L3. Three current transformers CT1, CT2, CT3 are provided one for each of the lines L1, L2, L3 for the purpose of supplying current to the overload relays OL1, OL2, OL3 and to one winding of each pair of the three pairs of windings of the directional relay DR1. A voltage transformer VT1 has its primary leads connected respectively to each of the leads L1, L2, L3 through suitable resistances and its secondary windings connected through the auxiliary contacts 3, 4, 5 of the circuit-breakers CB1 to the other windings of the directional relay DR1, these other windings being connected, as is well known, across the phases each one being connected across a different pair of phases. The arrangement is such that with an excess of current through any of the lines L1, L2, L3, that is an excess over a predetermined amount, the overload relay corresponding to the line on which the excessive current occurs will be energized with the result that one of the contacts 17, 18, 19 will be operated to open the series circuit through these contacts and to close its associated lower contacts which are connected in multiple with the lower contacts of the other overload relays. It will be noted that with this arrangement it does not matter whether one, two or all of the three relays OL1, OL2, OL3 are operated exactly the same circuit operation takes place, namely, the opening of the circuit through the upper contacts and the closing of a circuit through the lower contacts. The circuit arrangements controlled by the relays OL1, OL2, OL3 and by the relay DR1 are substantially identical with those described in connection with Figure 9. The differential relay D1, the resistance 20, contact 21 and contact 1 all correspond to similar parts in the left-hand side of the said figure. The right-hand side of the drawing is identical with the left-hand side, as will be noted, and includes current transformers CT4, CT5, CT6 corresponding to the current transformers CT1, CT2, CT3, the voltage transformer VT2 corresponding to the voltage transformer VT1, the overload relays OL4, OL5, OL6 corresponding to the overload OL1, OL2, OL3 and the directional relay DR2 corresponding to the directional relay DR1. The contacts 22, 23, 24 are arranged similarly to the contacts 17, 18, 19. The directional relay DR2, resistance 25, contact 26 and contact 9 correspond to similar parts in Figure 9. The tripping coils of the circuit-breakers are represented by the reference TC1 and TC2. The circuits of these coils in addition to including the contacts 21 and 26 respectively, also includes contacts 27 and 28 respectively of the directional relays DR1 and DR2 and the contacts 2 and 10 respectively of the circuit-breakers. Beyond showing three contacts 17, 18, 19 in place of one contact in the said Figure 9 and showing the additional contacts 2 and 10 on the circuit-breakers the controlling arrangements associated with the pilot wire are similar to those described in connection with Figure 8 and it is thought unnecessary to repeat the description in full in connection with this drawing.

In Figure 11 of the accompanying drawings an arrangement is shown for protecting the underground cable IK running between stations K and I from two different kinds of faults over a single pilot wire PWI. For this purpose use is made of quadruplex circuit arrangements similar to those described in connection with Figure 8, using the variations of strength of the effective current acting on the relays DI and DK for protection from faults of the kind in which the voltage of the system is reduced to a very low value and using the variations of direction of the resultant ampere-turns influencing the relays PDI and PDK for protection from incipient faults which do not materially affect the voltage of the system. The variations of strength of the effective current are controlled in part by directional relays DRI and DRK arranged to remain in the positions shown when current is flowing into the section and severally to take up the alternate positions when current above a predetermined value is flowing out of the section at the respective ends thereof; in conjunction with the directional relays overload relays OLI and OLK are arranged to operate when current above a predetermined value, greater than the previously mentioned value, flows into or out of the section.

It will be noticed that the batteries 7I and 7K alone are effective so long as either the respective directional relays or the respective overload relays are in their upper positions, that is to say so long as power is flowing out of the respective ends of the line section or so long as the flow of power past the respective overload relays is of insufficient value to operate the same; only when the respective directional relays and the respective overload relays are in their lower positions, that is to say, only when power is flowing into the respective ends of the line section and when the flow of power past the respective overload relays is of sufficient value to operate the same are the associated batteries 6I and 6K made effective. The joint effect of the overload relay and the directional relay at an end of the line section therefore is to exert a control similar to the control exerted by one of the directional relays 8H or 8I shown in Figure 8, the only difference being that in Figure 11 battery 6I or 6K cannot become effective as regards the relays in circuit with the pilot wire until the flow of power in the adjacent end of the line section is sufficient to operate the associated overload relay. In view of this and of the description given in connection with Figure 8 the protection given by the relays DI and DK and the manner in which current flow in the local circuits at the ends of the line section and in the pilot wire PWI is influenced by operation of the overload relays OLI and OLK and of the directional relays DRI and DRK will be readily understood without further description. Differential relays DI and DK of course correspond to the relays 9H and 9I of Figure 8, whilst polarized differential relays PDI and PDK correspond to the relays 11H and 11I of that figure. It should be noticed that in Figure 8 the negative poles of the batteries 7H and 7I under the conditions shown are earthed, whilst in Figure 11 the positive poles of the batteries are earthed; the relays PDI and PDK must therefore be considered as being polarized in the reverse directions with respect to the corresponding relays 11H or 11I of Figure 8. T1 and T3 are tripping coils for the circuit-breaker CBI at station I end of the line 10, whilst T2 and T4 are tripping coils for the circuit breaker CBK at the station K end of the line 10. The tripping coils T1 and T2 are respectively controlled by directional relay DRI and differential relay DI and by directional relay DRK and differential relay DK and are effective only when energized by the associated battery 6I or 6K as well as by the associated battery 7I or 7K. Contacts 30I in the circuit of tripping coil T3 are controlled by the polarized differential relay PDI, whilst the direction of current flow through the coil is controlled by the reversing relay RRI and the tripping means associated with the coil is polarized so that the means is effective only if current flows through the coil from left to right as shown in the figure, although current merely from the associated battery 7I or 7K is sufficient to effect operation. Similarly contacts 23K in the circuit of tripping coil T4 is controlled by the polarized differential PDK, whilst the direction of current flow through the coil is controlled by the reversing relay RRK and the tripping means associated with the coil is polarized so that the means is effective only if current flows through the coil from right to left as shown in the figure, although current merely from the associated battery 7I or 7K is sufficient to effect operation.

Time lag devices TL and TK are also incorporated in the system and for the purpose of describing the operation of the time lag device TK certain switching devices associated with the arrangement described in Figure 12 are shown in the lower right-hand corner of Figure 11. It will be appreciated that only sufficient apparatus has been shown for enabling the operation of the time lag device TK to be clearly understood. Further the operation of the time lag device TL is similar to that of TK and hence has not been described. The description of the operation of the time lag device is postponed until the arrangement of Figure 12 has been discussed since an understanding of the arrangement of Figure 12 is essential for understanding the operation of the time lag device.

KW1 and KW2 are central zero kilowatt indicators (i. e., induction type wattmeters) measuring the power at each end of a section controlled by the pilot wire PWI. The pointers or equivalent members P1 and P2 are adapted to engage contacts 11I, 12K when the power measured by the respective indicators is flowing from station I to station K and is increasing and to engage contacts 13I and 14K when the power is flowing in the same direction and measured by the respective indicators is decreasing. On the other hand if power is flowing from station K to station I and the power measured by the indicators is increasing the pointers P2 and P1 respectively engage contacts 14K and 13I but if the power measured by the indicators is decreasing the pointers P2 and P1 respectively engage contacts 12K and 11I. The contacts 11I and 13K and the contacts 12I and 14K are mounted on a movable carriage controlled by motors having field windings M1, M2, M3, M4 in such a way that when a pointer moves to engage a contact due to a change in the power flowing in or out of the section, the motors operate to move the contacts to a new position with the pointer out of engagement with both contacts. This arrangement is well known but it is believed that its application to the protection of power lines is novel. RI and RK are compensating resistances, whilst RRI and RRK are reversing relays biased to the positions shown, but adapted to be moved to the reverse positions by energization of their respective windings.

Now, normally the power measured at one end of the cable will be the same as the power measured at the other end of the cable unless there is a fault on the line. If a fault occurs then the power flowing into the cable at one end will increase while the power flowing out of the cable at the other end will decrease, that is to say, assuming that the leak takes place when the power is flowing into the section at the left-hand end then the indicator KW1 will show an increase of power and the contact 11I will be closed. At the same time the power flowing out at the right-hand end of the section will be decreased and the contact 14K will be closed. A circuit will therefore be completed as follows: battery, motor armature MA1, pointer P1, contact 11I, winding of reversing relay RRI, field winding M2, battery. The motor operates in this circuit so as to move the contact 11I away from the pointer P1, while the reversing relay RRI operates to reverse the polarity of the effective battery or batteries. Similar operation occurs at the right-hand end of the line, the reversing relay RRK being operated.

Clearly operation of the relay RRI is in result similar to the operation of relay 12H of Figure 8, whilst operation of the relay RRK is in result similar to the operation of relay 12I of Figure 8. Although the operation of corresponding parts in Figures 8 and 9 is in many respects similar, the following circuit conditions will be considered. It has been assumed that power is flowing into the section from the left-hand end and flowing out at the right-hand end. Consequently under sound conditions of the line section relay DRI will be in the position shown, the position of the relay OLI will be say in the reverse direction to that shown, the relay OLK will then be in the reverse position to that shown and relay DRK will be in the reverse position to that shown. The circuit over the pilot wire prior to a fault occurring in these conditions assuming that the value of power flow is constant will accordingly be as follows: earth, contact 15I, contact 17I, contact 18I, positive pole of battery 6I, battery 6I, battery 7I and then from negative pole of battery 7I through contact 19I midpoint of the winding of differential relay DI. Here the circuit divides, part of the current flowing through the lower winding of relay DI and the lower winding of polarized differential relay PDI and resistance RI to earth, while the other part of the current flows over the upper windings of relays DI and PDI over the pilot wire PWI, upper windings of the relays PDK and DK to the middle point of the winding of relay DK, contact 22K, negative pole of battery 7K, battery 7K, contacts 21K and 20K to earth. A circuit may also be traced as follows: earth, contacts 20K and 21K, positive pole of battery 7K, battery 7K, contact 22K, middle point of the winding of relay DK, lower windings of relays DK and PDK, compensating resistance RK to earth. In this circuit it will be found following the lines indicated in connection with Figure 8 that the current flow is such as to operate the relay DK. Relays DI, PDI and PDK, however, do not energize. As the relay DRK is operated however, the operation of relay DK is of no effect. The circuits obtaining when relay RRI only is operated whilst relays OLI, DRK and OLK are operated will be considered. This will occur if the line is sound and the power flow increases at both ends. In this case the circuit over the pilot wire PWI extends as follows: earth, contact 24I, negative pole of battery 7I, batteries 7I and 6I, contacts 18I, 17I, 25I, midpoint of the winding of differential relay DI where the circuit divides, one branch passing through the lower windings of the relays DI and PDI and resistance RI to earth. The other branch extends over the upper windings of relays DI and PDI, the pilot wire PWI, upper winding of relays PDK and DK to midpoint of the windings of relay DK, contact 22K, negative pole of battery 7K and thence from the positive pole of battery 7K through contacts 21K, 20K to earth.

It will be noted that the effect of this is to connect the batteries 7I and 6I and the battery 7K in series and in the same sense. Under this condition a local circuit at the right-hand end of the section may be traced as follows: earth, contacts 20K, 21K, positive pole of battery 7K, battery 7K, contact 22K to midpoint of differential relay DK and thence to the lower windings of relays DK and PDK and resistance RK to earth. The current through the upper winding is sufficiently greater than the current through the lower winding to cause relay PDK to energize and close the contact 23K. A circuit can thereupon be traced as follows: earth, contact 23K, tripping coil T4, contact 22K, negative pole of battery 7K, battery 7K, contacts 21K, and 20K to earth. The tripping coil, however, is polarized and cannot operate with the current flowing through the coil T4 in this direction. The relay DK is also operated but since the relay DRK is also operated this is of no effect in energizing the trip coil T2.

It will be clear that if the current flowing through the section were to decrease, reversing relay RRK would operate in the following circuit: battery, motor armature MA2, contact 14K, reversing relay RRK, field winding M3 to battery. The operation of reversing relay RRK under circuit conditions similar to those described above would produce somewhat similar conditions to those described in connection with the operation of relay RRI but the relay DK will again operate to no effect since relay DRK is still operated and the relay PDI will operate instead of the relay PDK but without effect owing to the direction of current flow in the trip coil T3.

If an earth fault occurs on the section then currents through the indicator KW1 will cause it to indicate an increased current so as to energize relay RRI, while the indicator KW2 will record a decreased current closing the circuit of relay RRK. When both relays RRI and RRK are energized and the relays OLI, OLK and DRK are operated the following circuit may be traced: earth, contact 24I, negative pole of battery 7I, battery 7I, battery 6I, contacts 18I, 17I, 25I to midpoint of the winding of differential relay DI; here the circuit divides, one half passing through the lower windings of relays DI and PDI, resistance RI, to earth, and the other half passing through the upper windings of relays DI and PDI, pilot wire PWI, upper windings of relays PDK and DK to the midpoint of the windings of relay DK, contacts 26K and 21K, positive pole of battery 7K, battery 7K, contact 24K to earth. A circuit may also be traced from earth, contact 24K, negative pole of battery 7K, battery 7K, contacts 21K and 26K, midpoint of the winding of differential relay DK lower windings of relays DK and PDK to earth. The result is that relays PDI and PDK operate and trip circuits are completed as follows: earth, contact 23K, relay coil T4, contacts 26K and 21K, positive pole of battery 7K, battery 7K, contact 24K to earth. The direction of current in this case is such that the polarized tripping means operates, thereby isolating the section at station K. At station I the relay PDI also operates by virtue of the current flowing in the circuit described through its lower winding and closes contact 30I, thereby completing a circuit as follows: earth, contact 30I, tripping coil T3, contacts 25I, 17I and 18I, positive pole of battery 6I, battery 6I, battery 7I, contact 24I to earth. The current in this circuit is such as to operate the tripping coil and the circuit-breaker CBI is tripped. It may be mentioned that the relay DK is also operated but is ineffective since the relay DRK is operated.

If the fault occurs in the line section whilst the power flowing is insufficient to operate the overload relays OLI and OLK the reversing relays RRI and RRK and the polarized differential relays PDI and PDK will nevertheless be operated and in view of the above description and of the description in connection with Figure 8 the operation will be readily understood. Thus whenever the power flowing into the section IK from station I increases and at the same time the power flowing out of the section from station K decreases the section is isolated. As mentioned above the tripping coils T1 and T2 are arranged so as not to operate with current from a battery 7I or 7K only and to operate only when the associated directional relay is in the position shown so as to connect battery 6I or 6K in series with battery 7I or 7K respectively. This is because when say, relays DK, OLK and DRK are operated, current from battery 7K will flow through the tripping coil T2 whilst the section is sound as will be readily understood.

If the flow of power through the line is from station K to station I and an earth fault occurs so that the power flow at station K end of the line increases whilst the power flow at station I end of the line decreases then the pointer P1 engages contact 11I and the pointer P2 engages contact 14K and reversing relays RRI and RRK are operated whereby the faulty section is isolated by the tripping of the circuit-breakers at its opposite ends.

If whilst no current is flowing in the line section a fault occurs so that power flow at both ends increases and the currents flow inwardly then pointer P1 engages contact 11I and pointer P2 engages contact 14K. Reversing relays RRI and RRK are therefore operated and the faulty section is isolated by the tripping of the circuit-breakers at its opposite ends.

If for any reason the kilowatt indicators KW1 and KW2 and the associated relays fail to give protection for which they are provided and the fault becomes sufficiently severe to cause reversal of current in the line section at the end thereof at which current was leaving the line, then relays DI and DK are operated and effect isolation of the line section. The circuit-breakers CBI and CBK are also provided with auxiliary switches ASI and ASK respectively. These switches are in the position shown when the circuit-breakers are "in", and are operated when the circuit-breakers are operated to open the lines. With the switch ASK in the position shown in the drawings, battery 7K only is applied to the pilot wire PWI. The circuit is as follows: earth, contacts 20K, 73K, 72K, 71K, positive pole of battery 7K, battery 7K, contacts 22K to the midpoint of the winding of relay DK, where the circuit divides, part going over the lower windings of relays DK and PDK while the other goes over the upper windings of these relays to the pilot wire PWI. If now the circuit-breaker CBK is tripped manually, the switch ASK will open contacts 71K and close contacts 74K. The effect of this operation will be to open the above traced circuit and to close a further circuit over the pilot wire with the two batteries 6K and 7K in series. This circuit may be traced as follows: earth, contacts 20K, 74K, 75K, positive pole of battery 6K, batteries 6K and 7K, contacts 22K whereupon the circuit is the same as that traced above. The circuit over the pilot wire is thus unbalanced and it will be appreciated from the general circuit considerations given above that relay PDI will operate to close the circuit of the tripping coil T3 whereupon the circuit-breaker CBI will be tripped. Similar circuit operations will of course occur if the circuit-breaker CBI is tripped manually.

Figure 12 shows the application of the arrangement shown in Figure 9 to quadruplex working and is of particular use when power can be fed to the line from one end only thereof. The application shown relates to quadruplex working for protecting two lines between stations K and L by a single pilot wire PWKL. An important modification is the provision of an alternative arrangement to that of causing a circuit-breaker at the distant end of a line to trip by tripping the circuit-breaker at the near end. The opening of the pilot wire circuit for this purpose can no longer be employed as such an opening would effect both channels and accordingly in this figure resort is had to the fact that an equivalent effect can be produced by artificially establishing suitable electrical conditions in each channel, which conditions do not in any way effect the operation of the protective system of the other channel. The lines to be protected are represented by the references 1KL and 2KL, the circuit-breakers by the references CBK1, CBK2, CBL1 and CBL2.

The trip coils TCK1 and TCL1 are provided for tripping out the circuit-breakers CBK1 and CBL1 respectively but are ineffective unless energized by a battery HVB1 or HVB2 as well as by a battery LVB1 or LVB2 respectively. The trip coils TCK2 and TCL2 are provided for tripping out the circuit-breakers CBK2 and CBL2 respectively but the tripping means are polarized so that current is effective only when the current flow is in an upward direction as shown in the figure. The directional relays responsive to the current flowing in line 1KL are given the references DRK1 and DRL1. The directional relays responsive to the current flowing in line 2KL are given the references DRK2 and DRL2. OLK1 and OLL1 represent the overload relays for line 1KL and OLK2 and OLL2 represent the overload relays for line 2KL. ASK1 and ASL1 represent auxiliary switches operated when the circuit-breakers CBK1 and CBL1 are operated, these auxiliary switches being shown in the position they occupy when the circuit-breakers are "in". ASK2 and ASL2 represent the auxiliary switches associated with the circuit-breakers CBK2 and CBL2 respectively and are similarly shown in a position corresponding to the circuit-breakers being "in." The directional relays and the overload relays in the drawings are all shown in the position which they occupy when no current is flowing. The directional relays are arranged to operate only when current above a predetermined value is flowing out of the section at the ends with which they are associated, while the overload relays are arranged to operate only when current above a greater predetermined value is flowing in the line whether in or out. In connection with this circuit it would appear to be only necessary to describe the effect of the auxiliary switches ASK1 and ASL1 as regards the first channel and the auxiliary switches ASK1 and ASL1 as regards the second channel.

Relays DRK1 and OLK1 and auxiliary switch ASK1 control circuit conditions in a manner substantially similar to that of the directional relay 8H at the left-hand end of line 1H in Figure 8, for if the auxiliary switch ASK1 and the overload relay OLK1 are in the position shown, or if the directional relay DRK1 is in the reverse position, that is to say if power is flowing out of the line section at that end the battery LVB1 alone is effective, but if, whilst the directional relay DRK1 is in the position shown, either the overload relay OLK1 or the auxiliary switch ASK1 is operated then the battery HVB1 is also made effective.

Similarly the relays DRL1 and OLL1 and auxiliary switch ASL1 control circuit conditions in a manner substantially similar to that of the directional relay 8I at the right-hand end of line 1H in Figure 8. Thus it will be noted that whenever current reaches a predetermined value OLK1 operates and the connection between contacts 3K and 6K is opened at contacts 5K and 6K, while the connection between the armature 11K of the directional relay DRK2 and the contact 12K of the directional relay DRK1 is closed at contacts 9K and 10K. If on the other hand the circuit-breaker CBK1 is tripped, exactly the same effect is brought about, that is the connection between the contacts 3K and 6K is opened at contacts 3K and 4K and the connection between the contact 12K and the armature 11K is closed at contacts 7K and 8K. Under fault conditions in the line 1KL the directional relay DRK1 will always be in the position shown and consequently the effect of either OLK1 operating or ASK1 changing its position due to the circuit-breaker tripping will be to connect up high voltage battery HVB1 thereby bringing about an equivalent condition to that brought about by the operation of a directional relay 8H as described in connection with Figure 8, with the result that as long as the directional relay DRK1 is in the position shown the differential relay DFL at the other end of the line will be operated to close a point in the tripping circuit, which circuit will therefore be completed because in the circumstances mentioned the directional relay at that end will also be in the position shown. The principal point of difference between the present arrangement and that of Figure 9, it will be noted, is that instead of as previously opening the pilot wire circuit in the case of a fault, in the present arrangement the pilot wire circuit is modified so as to bring about conditions which will ensure operation of the circuit-breaker at the other end of the line and at the same time there will be no interference with the control exerted over the other channel. The same operation can, of course, be brought about independently of a fault by simply tripping the circuit-breaker CBK1 at one end of the line, thereby operating the auxiliary switch ASK1 this in turn operating the differential relay DFL and closing the circuit for the tripping coil TCL1 of circuit-breaker CBL1 over contacts 13L and 14L. The directional relay DRL1 will take up the position shown in which the contacts 13L and 14L are closed as soon as the circuit-breaker CBK1 is operated as clearly no power can come from the section under these conditions. If it is borne in mind that the differential relays DFK and DFL can be operated both by opening the pilot wire circuit whilst the high voltage batteries are operative and by placing suitable electric conditions on the pilot wire circuit, then it is clearly possible to replace the arrangement shown in Figure 9 in which the pilot wire circuit is opened by the arrangement just described, which consists of placing the appropriate electric conditions on the pilot wire instead of opening its circuit. It will be simple to understand the arrangement of the auxiliary switches ASK2 and ASL2.

The directional relay DRK2, the overload relay OLK2 and the auxiliary switch ASK2 control circuit conditions in a manner substantially similar to that of the directional relay 12H at station H end of line 2H of Figure 8, for if current is flowing out of the line section at the left-hand end thereof the relay DRK2 connects the negative pole of battery LVB1 to earth, or if current is flowing at the said end into the line section but is insufficient to operate the relay OLK2, that relay and the auxiliary switch ASK2 connect the negative pole of the said battery to earth. If, however, current is flowing into or no current is flowing in the line section at the left-hand end thereof so that the relay DRK2 is in the position shown and the relay OLK2 or the auxiliary switch ASK2 is operated the negative pole of battery LVB1 is connected to the midpoint of the windings of relay DFK. Similarly directional relay DRL2 overload relay OLL2 and auxiliary switch ASL2 control circuit conditions in a manner substantially similar to that of the directional relay 12I at station I end of line 2H of Figure 8. Thus OLK2 when operated, opens contacts 21K and 22K, thereby opening the connection between contacts 21K and 24K and closing contacts 25K and 26K, thereby completing a circuit between contacts 29K and 30K. It also, by opening contacts 31K and 32K, opens a connection between contacts 31K and 34K and by closing contacts 35K and 36K it closes a circuit between earth and contact 310K. It will be clear from what has been previously described that the purpose of operating relay OLL2 is to effect the operation over the pilot wire of the polarized differential relay PDL, which closes a point in the circuit of the tripping coil TCL2 of the circuit-breaker CBL2 and will in fact cause the tripping of such circuit-breaker if the directional relay is in a position indicating that either current of less than a predetermined value is flowing or current is flowing into the section at that end.

Now exactly the same effects it will be noted are brought about when the auxiliary switch ASK1 is operated. Contacts 23K and 24K are opened and consequently the connection between the contacts 21K and 24K is opened while contacts 27K and 28K are closed, thereby completing a connection between the contacts 29K and 30K. Contacts 33K and 34K are opened and contacts 37K and 38K are closed, thereby opening a circuit between contacts 31K and 34K and closing a circuit between contact 310K and earth. This also has the effect of operating relay PDL and in this case as the directional relay must be in the position shown the tripping coil TCL2 is operated.

While generally the relationship between the new circuits and the circuits previously described has been referred to it would perhaps be as well if some of the actual circuits which are established under various conditions are referred to in detail.

Dealing with the protection of line 1KL only and assuming that the protection devices for lines 1KL and 2KL are in the positions shown, circuits may be traced as follows: earth, contacts 21K, 22K, 23K and 24K, negative pole of battery LVB1, battery LVB1, contacts 3K, 4K, 5K, 6K, 34K, 33K, 32K and 31K, midpoint of the windings of the differential relay DFK; here the circuit divides, one half passing over the lower windings of relays DFK and PDK, resistance RK to earth. While the other half passes over the upper windings of relays DFK and PDK, pilot wire PWKL, upper windings of PDL, DFL, contacts 41L, 42L, 43L, 44L, 45L, 46L, 47L and 48L to positive pole of low voltage battery LVB2, battery LVB2, contacts 49L, 50L, 51L and 52L to earth. In this circuit the batteries balance one another and consequently there is no current flowing over the pilot wire. A further circuit may be traced as follows: earth, contacts 52L, 51L, 50L and 49L, negative pole of battery LVB2, battery LVB2, contacts 48L, 47L, 46L, 45L, 44L, 43L, 42L and 41L, lower windings of relays DFL and PDL, resistance RL to earth. The direction of current flowing in the local circuits described is in the wrong direction to operate either of the relays PDK or PDL, while the strength of the current is insufficient to operate either the relay DFK or DFL. Assuming that power is passing from left to right through line 1KL and that the relays OLK1 and OLL1 are operated whilst no power is flowing in line 2KL, relay DRK1 will remain in the position shown, while relay DRL1 will respond to current flowing out of the section and take up a reverse position, i. e., to open contacts 13L and 14L and to close contacts 53L and 54L. In these circumstances owing to contacts 9K and 10K being closed and contacts 55K and 12K being closed, the high voltage battery HVB1 will be connected in series with the low voltage battery LVB1 in the circuit described over the pilot wire. At the other end of the pilot wire the effect of closing contacts 53L and 54L will be to neutralize the effect of opening contacts 45L and 46L and the opening of contacts 13L and 14L will prevent the closure of contacts 58L and 59L being of any effect. Therefore, the effect of the additional battery over the pilot wire circuit will be to cause relay DFL to operate, the current flowing through the lower windings of relays PDK and PDL will still be in the wrong directions to effect their operation, consequently the contacts 60L and 61L will be closed to prepare a circuit for the tripping coil TCL1. Now if a fault occurs of such a nature that no current flows out of the section or current of insufficient value to maintain relay DRL1 operated, contacts 53L and 54L will be opened and contacts 13L and 14L will be closed, whilst contacts 45L and 46L of overload relay OLL1 will be closed but there will be no corresponding change at station K end of the line.

The opening of contacts 53L and 54L opens one path from the positive terminal of battery LVB2 to the midpoint of the windings of relay DFL but a second path is completed over the contacts 45L, 46L, 47L and 48L. Under these circumstances since the relay DRK1 is in the position shown whilst the relay OLK1 is operated and it is assumed that no current is flowing in the line 2KL, batteries HVB1, LVB1 and LVB2 are operative and the battery LVB2 opposes the batteries HVB1 and LVB1. It therefore follows that the relay DFL only is operated, but by operating completes a tripping circuit as follows: positive terminal of battery HVB2, contacts 14L and 13L, trip coil TCL1, contacts 60L and 61L, negative pole of battery LVB2, and batteries LVB2 and HVB2. The circuit-breaker CBL1 therefore trips out and in doing so operates the auxiliary switch ASL1.

Operation of the auxiliary switch ASL1 opens the contacts 47L and 48L, thereby interrupting the connection between the positive pole of battery LVB2 and the midpoint of the windings of relay DFL whilst that point is connected by closure of the lower pair of contacts of the auxiliary switch ASL1 through those contacts and contacts 13L and 14L to the positive pole of battery HVB2. Under these circumstances no current flows over the pilot wire PWK1 and the relay DFK is operated as well as the relay DFL and closure of the contacts of relay DFK completes a tripping circuit as follows: positive pole of battery HVB1, contacts 55K, 12K, trip coil TCK1, contacts 63K and 62K negative pole of battery LVB1, and batteries LVB1 and HVB1. The circuit-breaker CBK1 therefore trips out and the line section 1KL is isolated. In view of the above description and of the description given in connection with Figure 8 operation of relays DFK and DFL and of the associated directional and overload relays and of the associated auxiliary switches under other possible conditions will readily be understood without further description.

If it happens that the circuit-breaker CBK1 fails to operate, a time-lag device arranged in series with the tripping coil TCK1 and shown in Figure 11 is caused to operate to cut out the preceding section. The operation of the time-lag device TK will be seen by reference to Figure 11. When the tripping coil TCK1 is energized, one or other of the following circuits are also closed depending on whether the directional relay DRK1 is operated or not: (a) directional relay DRK1 operated; positive pole of battery HVB1, battery HVB1, contacts 60K, 61K, time-lag device TK, tripping coil TCK1, contacts 63K, 62K, negative pole of battery LVB1, battery LVB1, negative pole of battery HVB1. If the circuit-breaker fails to operate, the time-lag device will energize after a predetermined period and open contacts 72K and close contacts 70K. The effect of this will be the same as that described with reference to the operation of the auxiliary switch ASK. That is to say, battery 6K will be added to battery 7K and the consequent increase in current flow over the pilot wire and through the lower windings of relays DK and PDK will cause the operation of relays PDL and PDK whereupon the tripping coils T3 and T4 are energized and the circuit-breakers CBI and CBK are tripped and the section isolated. The operation of the time-lag device TL is similar to that of TK but will be controlled from the preceding section.

The protection of line 2KL will now be considered. Assuming the relays to be in the positions shown the same original circuit over the pilot wire occurs as previously described, PDK and PDL having current flowing through their upper and lower windings respectively in such directions as not to effect their operation. Assuming that current is flowing into the line 2KL at the left-hand end and out at the right-hand end, then directional relay DRK2 would be in the position shown, OLK1 would be in the reverse position, DRL2 would be in the reverse position and OLL2 would be in the reverse position. In these circumstances a circuit may be traced over the pilot wire as follows, assuming that the circuit conditions on line 1KL are as shown in the drawing: earth, contacts 25K, 36K, 310K, 11K, 6K, 5K, 4K and 3K, positive pole of battery LVB1, battery LVB1, contacts 29K, 26K, and 25K, to midpoint of the windings of relay DFK. Here the circuit branches, one branch being completed over the lower windings of relays DFK, PDK, to earth and it will be noted that the direction of current flowing over the windings of these relays has been reversed; the other branch extends over the upper windings of relays DFK and PDK, pilot wire PWKL, upper windings of relays PDL and DFL to the midpoint of the windings of relay DFL, contacts 68L, 69L, 45L, 46L, 47L and 48L, positive pole of battery LVB2, battery LVB2, contact 70 to earth. It will be noted that the batteries LVB1 and LVB2 are now in series and consequently the current flowing over the upper winding of relay PDL will be of greater value than the current flowing through the lower winding and would be in such a direction as to cause the closure of contacts 71L and 72L in the circuit of the tripping coil TCL2. This causes current to flow through the tripping coil TCL2 as follows: earth, contacts 73L, 74L, 72L and 71L, TCL2, contacts 65L, 64L, 68L, 69L, 45L, 46L, 47L and 48L, positive pole of battery LVB2, battery LVB2, contact 70L to earth. The tripping means associated with the tripping coil TCL2 is, however, polarized and the resulting current flow is in such a direction that it has no effect. As regards the relay PDL the current through the upper winding is sufficiently great to overcome the effect of current through the lower winding and is in such a direction as not to operate the relay under these conditions.

If now a fault occurs in the line section 2KL so that the value of current flow at the right-hand end of the section falls to zero or substantially to zero the relays DRL2 and OLL2 restore, whereby the negative pole of battery LVB2 is connected through contacts 49L, 50L, 51L and 52L to earth and the positive pole of that battery is connected through contacts 48L, 47L, 46L, 45L, 44L, 43L, 42L and 41L to the midpoint of the windings of relay DFL. Under these circumstances the batteries LVB1 and LVB2 are in series with one another and act in the same sense, whilst the current flow in the pilot wire PWKL is in such a direction that the relay PDL operates. A circuit is therefore made from the positive pole of battery LVB2 through contacts 48L, 47L, 46L, 45L, 69L, 75L, 72L and 71L, trip coil TCL2 and contact 76L to the negative pole of battery LVB2. The circuit-breaker CBL2 therefore trips out and in doing so operates the auxiliary switch ASL2.

Operation of the switch ASL2 reverses the connections of battery LVB2 since the negative pole of that battery is now connected through contacts 76L, 66L and 67L to the midpoint of the windings of relay DFL and the positive pole is connected through contacts 48L, 47L, 46L and 45L, 69L, 75L, and the upper pair of contacts of the auxiliary switch ASL2 to earth. The batteries LVB1 and LVB2 are now acting in opposition to one another so that no current flows over the pilot wire PWKL. The currents in the local circuit, however, are such that the relay PDK is operated as well as the relay PDL. A tripping circuit is therefore completed from the positive pole of battery LVB1 through contacts 3K, 4K, 5K, 6K, 11K, 31K, 78K and 77K, the trip coil TCKL and contact 29K to the negative pole of battery LVB1. The circuit-breaker CBK2 trips out and the line 2KL is isolated.

In view of the above description and of the description given in connection with Figure 8 operation of relays PDK and PDL and of the associated directional and overload relays and of the associated auxiliary switches under other possible conditions will readily be understood without further description.

Where reversal of current can occur the auxiliary switches are useful in case the circuit-breaker at one end of a line section is tripped and opened so as to make the overload relay associated with it inoperative before the circuit-breaker at the far end of the section is tripped. In this case the auxiliary switch at the end that breaks first maintains the same circuit conditions as the overload relay in its operated position. If the circuit conditions were not maintained then the breaker at the far end would remain closed.

We claim:

1. In an electric power transmission system a power line, a source of electrical energy for supplying power to said line, switching devices responsive to current flowing in the power line from said source one being provided at each end, an auxiliary circuit extending between the ends of said power line, a second source of electrical energy independent of said first source, means controlled by said switching devices for causing current from said second source to flow over said auxiliary circuit and means responsive to the interruption of current flowing from said second source over the auxiliary circuit for effecting the isolation of the power line from the system.

2. In an electric power transmission system a power line, a source of electrical energy for supplying power to said line, switching devices responsive to current flowing in the power line from said source one being provided at each end, an auxiliary circuit extending between the ends of said power line, a second source of electrical energy independent of said first source, means for causing a current to flow from said source over said auxiliary circuit other than when a fault occurs in said power line and when current flowing in at one end is the same as current flowing out at the other end, means controlled by said switching devices for changing the current flowing from said second source in a predetermined manner and means responsive to the new current flowing over said auxiliary circuit and created by said current changing means for effecting the isolation of the power line from the system.

3. In an electric power transmission system a power line, a source of electrical energy for supplying power to said line, an auxiliary circuit extending between the ends of said power line, means for causing current to be transmitted over said auxiliary circuit, switching means controlled by current flowing in the power lines for causing a current flowing over said auxiliary circuit to be varied in one predetermined manner, means responsive to said predetermined variation for effecting the isolation of the power line from the system, a second switching means for causing the current flowing over said circuit to be varied in a different predetermined manner independently of the variation made by said first switching means and means responsive to said different predetermined variation which means in conjunction with said second switching means enables signals to be transmitted between the end of said power line for any desired purpose independently of the signals transmitted by said first switching means.

4. In an electric power transmission system comprising a plurality of sections, circuit-breakers at each end of one section, circuit-breakers at each end of an adjacent section, tripping coils associated with said circuit breakers, auxiliary circuits linking the ends of said sections, means located at each end of said sections responsive to current flowing in the sections at that end and arranged to control the operation of said circuit-breakers over said auxiliary circuits and a time-lag device located at one end of said first section controlled jointly with the tripping coil of the circuit-breaker at the adjacent end of said first section by the said means which are associated with said first section to exert a control over the auxiliary circuit associated with said adjacent section if said tripping coil is not effective in operating the circuit-breaker associated with it to cause the circuit-breaker at the distant end of said adjacent section to be operated.

5. In an electric power transmission system a power line, a source of electrical energy for supplying power to said power line, switching devices responsive to the direction of current flowing in the power line one being provided at each end of said power line, an auxiliary circuit extending between said switching devices, a second source of direct current electrical energy independent of said first source, means controlled by one of said switching devices when operated for establishing circuit connections including said second source to said auxiliary circuit as to cause current to flow thereover, means controlled separately from said first means for establishing different circuit connections to said auxiliary circuit, circuit-breakers at each end of said power line, controlling devices in said auxiliary circuit which respond when said different circuit connections are established to said auxiliary circuit and to control jointly with said switching devices the operation of said circuit-breakers to effect the isolation of the power line from the system.

6. In an electric power transmission system a power line, a source of electrical energy for supplying power to said power line, switching devices responsive to the direction of current flowing in said power line, one being provided at each end of said power line, an auxiliary circuit extending between said switching devices, a source of direct current electrical energy independent of said first source, means at one end of said power line controlled by one of said switching devices when operated by current flowing in the power line in a particular direction to change circuit connections including said direct current source at one end of said auxiliary circuit, a second source of direct current electrical energy, a second means identical with said first means but at the other end of said power line and controlled by the other of said switching devices when operated by current flowing in the power line in the opposite direction to said first mentioned direction to change circuit connections including said second source of direct current to the other end of said auxiliary circuit and means included in said auxiliary circuit and responsive when a predetermined relationship exists between the circuit connections at the two ends of said auxiliary circuit to cause said power line to be isolated from the system.

7. In an electric power transmission system, a power line, circuit-breakers at each end of said line, directional relays responsive to the direction of current flowing in said power line, a pilot wire extending between the stations at which the ends of the power line are located, a source of direct current electrical energy, means controlled by one of said directional relays when operated to change circuit connections including said source at one end of said pilot wire, tripping coils for said circuit-breakers, a device controlled by current flowing over the pilot wire from said source for keeping open the circuit of the tripping coil of one of said circuit-breakers and means controlled by the other of said directional relays to change circuit connections at the other end of said pilot wire so as to modify the current flowing thereover and cause said device to close the circuit of the tripping coil of the other circuit-breaker.

8. In an electric power transmission system, a power line, circuit-breakers at each end of said line, directional relays responsive to the direction of current flowing in said power line, a single pilot wire extending between the stations at which the ends of the power line are located, a source of direct current electrical energy arranged to be connected in circuit with said pilot wire, tripping coils for said circuit-breakers, a device connected to one end of said pilot wire for controlling the circuit of the tripping coil of the circuit-breaker at that end, a second device connected to the other end of said pilot wire for controlling the circuit of the tripping coil of the circuit-breaker at said other end of said pilot wire and circuit arrangements at said other end of said pilot wire including means arranged to be operated for effecting the operation of said first device to effect the operation of the circuit-breaker at the end of the power line at which it is located over the pilot wire without effecting the operation of said second device.

9. In an electric power transmission system a power line, a circuit-breaker at one end of said line, a directional relay responsive to the direction of current flowing at the other end of said power line, a single pilot wire extending between the stations at which the ends of the power line are located, a source of direct current electrical energy, a tripping coil for said circuit-breaker, a polarized relay controlling the circuit of said tripping coil and connected to the end of said pilot wire at which said circuit-breaker is located, means for connecting said source of current to said pilot wire so as to cause current to flow thereover and through said polarized relay in such a direction as not to effect its operation and means controlled by said directional relay for reversing the direction of current flowing over said pilot wire so as to cause its operation and contacts to be closed in the circuit of said tripping coil to enable the associated circuit-breaker to operate.

10. In combination for use in a power transmission system, a power line, a source of electrical energy for supplying power to said line, apparatus located at one end of a power line for controlling the disconnection of said power line at that end in the event of a fault occurring therein including a switching device responsive to current flowing in the power line at that end, an electromagnetic relay, a circuit-breaker and a tripping coil for said circuit-breaker, a circuit extending to the other end of said power line to which said electromagnetic relay is connected, an auxiliary source of electrical energy independent of said first source, means associated with the other end of said circuit for effecting control of the electromagnetic relay by means of said auxiliary source of electrical energy and arranged independently of fault conditions on the line to control said electromagnetic relay to keep the circuit of said tripping coil open and means controlled by said switching device and said electromagnetic relay jointly when a fault occurs in the section for effecting the operation of the tripping coil of said circuit-breaker.

11. In combination for use in a power transmission system, a power line, a source of electrical energy for supplying power to said power line, apparatus located at one end of the power line for controlling the disconnection of said power line from that end in the event of a fault occurring therein including a switching device responsive to current flowing in the power line at that end, an electromagnetic relay a circuit-breaker and a tripping coil for said circuit-breaker, a second apparatus located at the other end of said power line including a switching device responsive to current flowing in the power line at said other end, an electromagnetic relay, a circuit-breaker and a tripping coil for said circuit-breaker, auxiliary sources of electrical energy independent of said first source available at each end of said power line, interconnecting means linking the apparatus at each end of the power line for enabling the switching devices of the apparatus at each end of the power line to control the electromagnetic relays of the apparatus at the opposite end by the auxiliary sources of electrical energy and means controlled by the switching device at one end in response to particular current conditions in said power line for closing a point in the circuit of the local tripping coil simultaneously with it exerting a control over said interconnecting means tending to cause the electromagnetic relay at the distant end to close a point in the circuit of the tripping coil at said distant end and means controlled by the switching devices at the other end in response to particular current conditions in the power line at said other end for closing a point in the circuit of the local tripping coil simultaneously with it exerting a control over said interconnecting means tending to cause the electromagnetic relay at the distant end to close a point in the circuit of the tripping coil at the distant end, the circuit arrangements being such that in the event of a fault in the power line both switching devices will operate to cause the circuit of the tripping coils at each end to be completed.

12. In combination for use in a power transmission system a power line a source of electrical energy for supplying power to said power line apparatus located at one end of the power line for controlling the disconnection of said power line at that end in the event of a fault occurring therein including a switching device responsive to current flowing in the power line at that end an electromagnetic relay, a circuit-breaker and a tripping coil for said circuit-breaker a circuit extending to the other end of said power line, an auxiliary source of electrical energy independent of said first source, a second switching device responsive to current flowing in the power line at the distant end thereof and means including said auxiliary source of electrical energy controlled by said second switching device for so controlling said electromagnetic relay over said circuit as to cause the circuit of said tripping coil to be maintained opened when the current to which the second switching device responds is flowing out of said power line.

13. In combination for use in a power transmission system a power line, a source of electrical energy for supplying power to said power line, apparatus located at one end of said power line for controlling the disconnection of said power line at that end in the event of a fault occurring therein, including a switching device responsive to current flowing in the power line at that end, an electromagnetic relay, a circuit-breaker, a tripping coil for said circuit-breaker, means controlled by said switching device closing a point in the circuit of said tripping coil, means controlled by said electromagnetic relay for closing a second point in the circuit of said tripping coil, a circuit extending to the other end of said power line, an auxiliary source of electrical energy independent of said first source and means including said auxiliary source adapted to exert control over said circuit for preventing said electromagnetic relay from closing said second point in the circuit of said tripping coil whenever said first point is closed except when a fault actually occurs in the section.

14. In an electric power transmission system a power line, a source of electrical energy for supplying power to said line, switching devices responsive to current flowing in the power line, one being provided at each end, an auxiliary circuit extending between the ends of said power line, an auxiliary source of electrical energy independent of said first source, means controlled by said switching devices for supplying current for said auxiliary source of one value to said auxiliary circuit when the power line is free from faults and means also controlled by said switching devices for supplying current of a different value from said auxiliary source to said auxiliary circuit when the power line is faulty, circuit-breakers at each end of said auxiliary circuit, tripping coils for said circuit-breakers, means connected to said auxiliary circuit responsive to current of said first value for maintaining the energizing circuit for said tripping coils open and means connected to said auxiliary circuit responsive to current of said second value for closing the energizing circuit of said tripping coils.

15. In an electric power transmission system, a power line, a circuit-breaker at one end of said line, a directional relay responsive to the direction of current flowing at the other end of said power line, a single pilot wire extending between the stations at which the ends of the power line are located, a source of direct current of electrical energy arranged to be connected in circuit with said pilot wire, a tripping coil for said circuit-breaker, a balancing circuit for said pilot wire, a differential relay controlling the circuit of said tripping coil and having the end of one winding connected to said pilot wire and the other winding connected at one end to said balancing circuit and at the other end to the other end of said first winding so that when said source of electrical energy is connected to the junction of said windings equal currents flow over both windings and the relay is inoperative and means controlled by said directional relay for changing the current flowing over the pilot wire and said first winding of said differential relay without effecting the current flowing through said other winding to cause said differential relay to operate and close contacts in the circuit of said tripping coil to enable the circuit-breaker to be operated.

16. In an electric power transmission system a power line, a single pilot wire extending between the stations at which the ends of the pilot wire are located, a source of direct current electrical energy, a balancing circuit for said pilot wire, a differential relay having the end of one winding connected to said pilot wire and the other winding connected between said balancing circuit and the other end of said first winding so that when said source of electrical energy is connected to the junction of said windings equal currents flow over both windings and the relay is inoperative, and means controlled by current flowing in said power line for changing the current flowing over the pilot wire and said first winding of said differential relay without effecting the current over said other winding to cause said differential relay to operate and effect the opening of the power line at the end where the differential relay is located.

17. In an electric power transmission system a power line, a single pilot wire extending between the stations at which the ends of the power line are located, a source of direct current electrical energy, a polarized relay connected to one end of the pilot wire, means for connecting said source of current to said pilot wire so as to cause current to flow thereover and through said polarized relay in such a direction as not to effect its operation and means for reversing the direction of current flowing over said pilot wire to energize said relay and cause the power line to be opened at the end where the polarized relay is located.

18. In an electric power transmission system, a power line, a pilot wire extending between the stations at which the ends of the power line are located, a source of direct current electrical energy, an electromagnetic relay, means for normally connecting said source to said electromagnetic relay over said pilot wire, a circuit-breaker located at the end of said power line distant from the end at which the electromagnetic relay is located and means controlled by said circuit-breaker adapted to effect a modification of said normal connections to cause said electromagnetic relay to effect the opening of the power line at the end at which it is located.

19. In an electric power transmission system, a power line, a pilot wire extending between the stations at which the ends of the power line are located, a source of direct current electrical energy at one end of said power line, a second source of direct current electrical energy at the other end of said power line, electromagnetic relays one at each end of said power line and means for normally connecting said first source to the electromagnetic relay at the end at which it is located and to the pilot wire, means for normally connecting said second source to the electromagnetic relay at the end at which said second source is located and to the other end of said pilot wire, means adapted to effect a modification of said first normal connecting means to cause the electromagnetic relay at the other end of the pilot wire to effect the opening of the power line at that end and means adapted to effect a modification of said second normal connecting means to cause the electromagnetic relay at the first end to effect the opening of the power line at that end.

20. In an electric power transmission system a power line, a pilot wire extending between the stations at which the ends of the power line are located, a source of direct current electrical energy, an electromagnetic relay, means for normally connecting said source to said electromagnetic relay over said pilot wire, a directional relay adapted to take up one position when current is flowing into the section or no current or current less than a predetermined magnitude is flowing either in or out of the section at the end of the section at which the directional relay is located and a different position when current above said predetermined magnitude is flowing out of the section and a device which operates when current above a predetermined magnitude is flowing in the section irrespective of its direction, said directional relay and said device being adapted jointly to effect a modification of said normal connections to cause said electromagnetic relay to effect the opening of a power line at the end at which it is located.

21. In an electric power transmission system, a power line, a single pilot wire extending between the stations at which the ends of the power line are located, a balancing circuit for said pilot wire, a differential relay having the end of one winding connected to said pilot wire and the other winding connected between said balancing circuit and the other end of said first winding so that when a source of electrical energy is connected to the junction of said windings equal currents flow over both windings and the relay is inoperative, a polarized differential relay having its windings connected in circuit with the windings of said differential relay respectively arranged so that when a source of electrical energy is connected to the junction of said windings equal currents flow over both windings and the relay is inoperative, means controlled by current flowing in said power line for varying the strength of current flowing over the pilot wire and said first windings of said differential relay and said polarized differential relay without effecting the current over said other windings to cause said differential relay to operate, means controlled by current flowing in said power line for changing the direction of current flowing over the pilot wire and said first windings of said differential relay and said polarized differential relay without effecting the current over said other windings to cause said polarized differential relay to operate and means controlled by said differential relay to cause the power line to be opened at the end where the differential relay is located.

22. In an electric power transmission system a power line, a single pilot wire extending between the stations at which the ends of the power line are located, a balancing circuit for said pilot wire, a differential relay having the end of one winding connected to said pilot wire and the other winding connected between said balancing circuit and the other end of said first winding so that when a source of electrical energy is connected to the junction of said windings equal current flow over both windings and the relay is inoperative, a polarizing differential relay having its windings connected in circuit with the windings of said differential relay respectively arranged so that when a source of electrical energy is connected to the junction of said windings equal currents flow over both windings and the relay is inoperative, means controlled by current flowing in said power line for varying the strength of current flowing over the pilot wire and said first windings of said differential relay and said polarized differential relay without effecting the current over said other windings to cause said differential relay to operate, means controlled by current flowing in said power line for changing the direction of current flowing over the pilot wire and said first winding of said differential relay and said polarized differential relay without effecting the current over said other windings to cause said polarized differential relay to operate and means controlled by said polarized differential relay to cause the power line to be opened at the end where the polarized differential relay is located.

23. In an electric power transmission system, a power line, a single pilot wire extending between the stations at which the ends of the power line are located, a balancing circuit for said pilot wire, a differential relay having the end of one winding connected to said pilot wire and the other winding connected between said balancing circuit and the other end of said first winding so that when a source of electrical energy is connected to the junction of said windings equal currents flow over both windings and the relay is inoperative, a polarized differential relay having its windings connected in series with the windings of said differential relay respectively arranged so that when a source of electrical energy is connected to the junction of said windings equal currents flow over both windings and the relay is inoperative, means controlled by current flowing in said power line for varying the strength of current flowing over the pilot wire and said first windings of said differential relay and said polarized differential relay without effecting the current over said other windings to cause said differential relay to operate, means controlled by current flowing in said power line for changing the direction of current flowing over the pilot wire and said first windings of said differential relay and said polarized differential relay without effecting the current over said other windings to cause said polarized differential relay to operate, means controlled by said differential relay to cause the power line to be opened at the end where the differential relay is located, and means controlled by said polarized differential relay to cause the power line to be opened at the end where the polarized differential relay is located.

REGINALD OTTO KAPP.
CHARLES GEORGE CARROTHERS.